(12) United States Patent
Archenhold

(10) Patent No.: US 8,659,237 B2
(45) Date of Patent: Feb. 25, 2014

(54) HYBRID POWER CONTROL SYSTEM

(75) Inventor: Geoffrey Howard Gillett Archenhold, Sutton Coldfield (GB)

(73) Assignee: Radiant Research Limited, Aldridge, West Midlands (GB)

(*) Notice: Subject to any disclaimer, the term of this patent is extended or adjusted under 35 U.S.C. 154(b) by 172 days.

(21) Appl. No.: 13/351,001

(22) Filed: Jan. 16, 2012

(65) Prior Publication Data

US 2012/0206064 A1    Aug. 16, 2012

(30) Foreign Application Priority Data

Jan. 17, 2011    (GB) ................................... 1100691.3

(51) Int. Cl.
*H05B 37/02*    (2006.01)

(52) U.S. Cl.
USPC ........................................................ 315/297

(58) Field of Classification Search
None
See application file for complete search history.

(56) References Cited

U.S. PATENT DOCUMENTS

| | | | |
|---|---|---|---|
| 5,008,595 A | 4/1991 | Kazar | |
| 6,016,038 A | 1/2000 | Mueller et al. | |
| 6,100,643 A * | 8/2000 | Nilssen | 315/209 R |
| 6,305,818 B1 | 10/2001 | Lebens et al. | |
| 6,864,644 B2 * | 3/2005 | Kernahan | 315/307 |
| 6,989,635 B2 | 1/2006 | Iwaki et al. | |
| 7,378,805 B2 * | 5/2008 | Oh et al. | 315/291 |
| 8,102,127 B2 * | 1/2012 | Melanson | 315/178 |
| 8,421,377 B2 * | 4/2013 | Kirchmeier et al. | 315/326 |
| 2004/0095081 A1 * | 5/2004 | Kernahan | 315/307 |
| 2004/0155844 A1 | 8/2004 | Stopa | |
| 2005/0218838 A1 | 10/2005 | Lys | |
| 2006/0214603 A1 * | 9/2006 | Oh et al. | 315/246 |
| 2009/0079360 A1 | 3/2009 | Shteynberg et al. | |
| 2009/0302779 A1 | 12/2009 | McKinney | |
| 2010/0013395 A1 | 1/2010 | Archibald et al. | |
| 2010/0171427 A1 * | 7/2010 | Kirchmeier et al. | 315/111.21 |

FOREIGN PATENT DOCUMENTS

| | | | |
|---|---|---|---|
| EP | 1691583 A2 | 8/2006 | |
| EP | 1986470 A2 | 10/2008 | |
| GB | 2346004 A | 7/2000 | |
| GB | 2369730 A | 6/2002 | |
| GB | 2398682 A | 8/2004 | |
| GB | 2408315 A | 5/2005 | |
| WO | WO02/48994 A1 | 6/2002 | |

* cited by examiner

*Primary Examiner* — Crystal L Hammond
(74) *Attorney, Agent, or Firm* — Bishop Diehl & Lee, Ltd.

(57) ABSTRACT

A hybrid power control system for providing dynamic power control to illumination systems in which a power source can supply any one of a range of AC or DC voltages. One or more switch mode power supplies incorporating one or more linear and switch mode regulator circuits combined to dynamically control current, voltage and power to the illumination system. A microprocessor or other integrated circuit device to receive and send control information in order to regulate the power to a light emitting device One or more output drive stage(s) capable of delivering a wide dynamic current range, channel bonding and protection circuitry compatible with standard or common anode illumination systems.

20 Claims, 16 Drawing Sheets

Figure 1
Prior Art
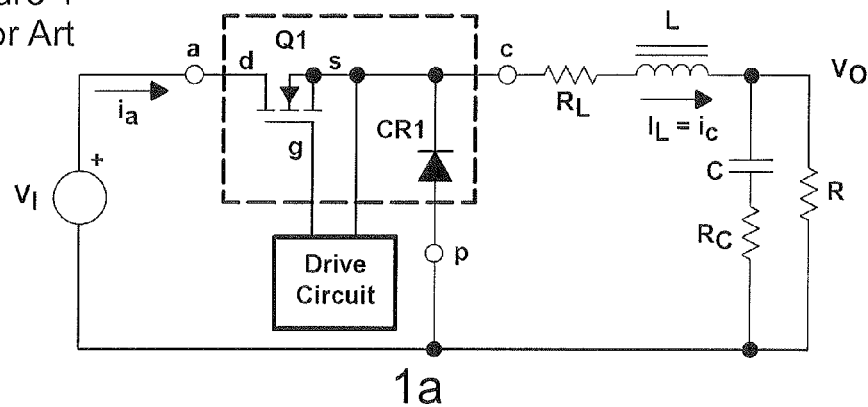
1a
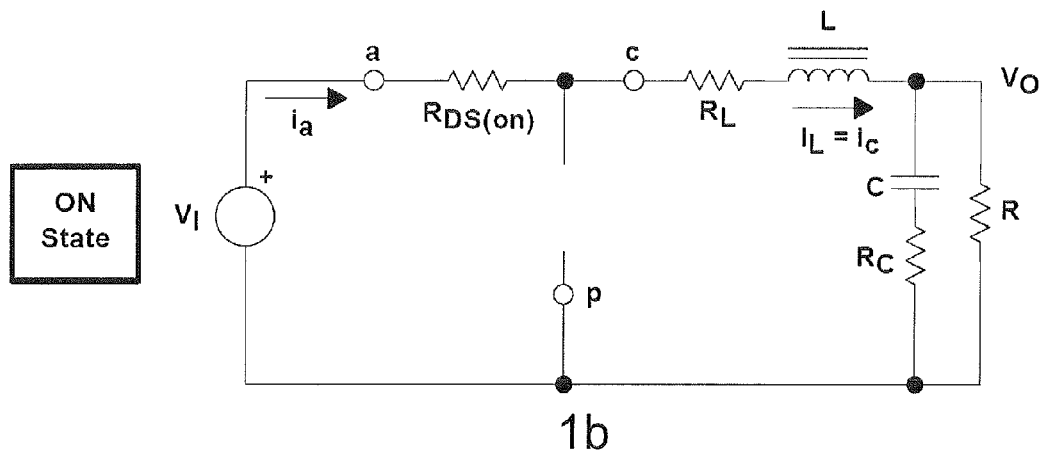
1b
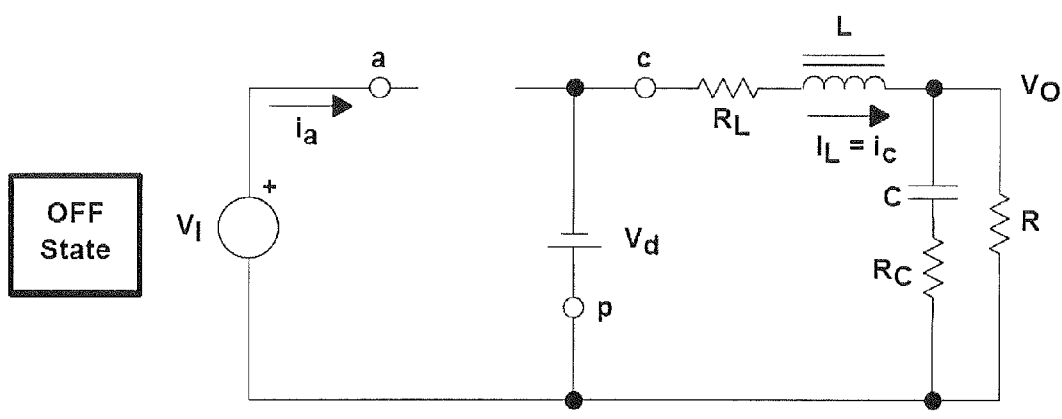
1c

HYBRID POWER CONTROL SYSTEM

CROSS-REFERENCE TO RELATED APPLICATIONS

This application claims the benefit of Great Britain Patent Application Serial No. 1100691.3 filed on Jan. 17, 2011.

TECHNICAL FIELD OF THE INVENTION

The present invention relates to improvements in methods and apparatus to power light sources, and in particular but not exclusively, relates to a highly efficient and robust method and apparatus to dim or otherwise adjust brightness or regulate the power to light sources such as Light Emitting Diodes (LEDs), Organic Light Emitting Diodes (OLEDs) and other solid-state light source loads. More especially, an efficient, power configurable, high reliability hybrid control system using dynamic power regulation to increase the dimming dynamic range and power control of solid-state illumination systems.

BACKGROUND OF THE INVENTION

The use of LEDs in illumination systems are well known as they offer significant advantages over traditional light sources such as higher efficacy, increased reliability due to their solid-state nature and increased longevity amongst many other advantages known to those familiar in the area of LEDs and OLEDs.

(O)LEDs are used in a wide variety of configurations for general and specific illumination applications including, but not limited to task lighting, accent lighting, emergency lighting, hospitality lighting, restaurant lighting, hospital lighting, office lighting, retail lighting, automotive lighting, street lighting, amenity lighting, effect lighting, marine lighting, display case lighting, TV, film and projection lighting, entertainment lighting, animal and food production lighting, medical lighting, outdoor lighting and backlighting of displays, corridor lighting, and the like.

LEDs and OLEDs are current-controlled devices where the intensity of light emitted from the device is related to the amount of current driven through the device. It is therefore highly advantageous to carefully and reliably control the amount of current flowing through the LED or OLED device(s) in order to achieve the desired illumination effect from an illumination system and to maximise the life of a device by ensuring the maximum current or power specifications are not exceeded.

(O)LED power supply systems have been developed based on a variety of circuit design topologies which provide the ability to vary the actual or time-averaged forward current through the light emitting device load over an acceptable range in order to provide dimming capabilities. (O)LED illumination systems have been devised which, through the use of multiple light emitting devices having discrete wavelengths/colours, can produce a variety of colours and intensities. Systems incorporating Red, Green, Blue, Amber and White light emitters can create near infinite colour variations by varying the intensity, current or power of each of the coloured light emitter(s) individually or together in combination.

As (O)LED illumination systems have become accepted by the general lighting industry various methods have been devised to control the current driven through the light emitting devices under control to achieve the desired dimming and colour mixing.

One common method for modulating the current through (O)LED devices is Pulse Width Modulation (PWM) such as that highlighted in patents GB2398682A, U.S. Pat. Nos. 6,305,818B1, 6,016,038, US2004/0155844A1, US2005/0218838A1, WO02/48994A1, GB2346004A and U.S. Pat. No. 5,008,595, all of which are incorporated herein by reference as if set forth in full. A PWM driver provide a pulsing of the current(s) through one or more (O)LEDs by changing from full current "ON" state to a zero current "OFF" state and is often know as digital dimming. The duty cycle of a PWM driver is defined by the ratio of the ON time to the total cycle time in a fixed cycle frequency. Dimming or power control of the (O)LEDs may be achieved by varying the duty cycle of current through the light emitting device(s) from 100% to 0% as the human eye integrates the ON/OFF pulses into a time averaged luminous intensity.

Although PWM schemes are common place due to the simplicity of digital switching between two binary states of ON and OFF they have significant disadvantages including:

1. Uneven power supply loading: By switching the light emitting device loads on and off at the same time causes the power supply to provide zero output or full output on a continuously switched basis which reduces the overall efficiency of the power supply unit (PSU)
2. The Electromagnetic interference (EMI) of a PWM system is far more complicated than with other control methods as the changes in duty cycle results in a wide frequency range of noise being emitted.
3. The amplitude of the EMI is increased as the forward current is increased as the pulsing currents through the electrical leads connecting the driver electronics to the illumination system fixtures may act as transmitters of radio frequency energy that could cause interference with other equipment as the interference is very high at the transition of the current switching.
4. The pulsing of PWM systems for a variety of applications are not acceptable especially where high refresh rates are required. For example, in TV and Film environments the camera's are usually digital and a mismatch between the camera capture frequency and the PWM fixed frequency results in poor quality imaging in both intensity and colour.
5. The dimming dynamic range of PWM systems are usually very poor as the only way to dim the lighting loads is by reducing the duty cycle and at low duty cycles there is a very small percentage of time when the light emitting device is actually illuminated. Some PWM systems offer high resolution 16-bit dimming (1:65535) ratios however as the dimming range is extended the maximum fixed frequency has to reduce which can results in visual flicker or a beating effect.
6. PWM systems have a fixed maximum forward current and additional circuitry is required in order to change this adding extra cost and complexity to the design.
7. PWM based systems are much less efficient at driving (O)LEDs when being dimmed in some circumstances up to 150% less efficient compared to DC or constant current reduction dimming as discussed by Gu, Y et al, in the SPIE 2006 paper entitled "Spectral and Luminous Efficacy Change of High-power LEDs under Different Dimming Methods". SPIE 6337, 63370J.
8. Additional thermal and electrical stresses are placed on the lighting load as power is rapidly cycled ON and OFF causing thermal cycling that adds stress to the LED die or bond wires attached to the LED die.
9. PWM systems make it more difficult to control complete illumination systems as it only has one variable (Duty Cycle) in which to change the control system output driver stage(s). For example, if an external thermal input is required into the control system additional duty cycle resolution will be required in order to control the output driver stage(s) according to the dimming level as a function of the illumination fixture temperature.

A second method known as Pulse Amplitude Modulation (PAM) and highlighted in patents GB 2369730 and GB 2408315A have been developed to overcome many of the shortfalls of PWM driver systems and is a hybrid dimming technique between pulsing and analogue topologies. Such a system offers improved dimming, efficacy and control performance by enabling two variable parameters to be effectively used to control current and power through the light emitting device(s) (pulse width and amplitude of pulse).

A third method often known as Direct Current (DC) dimming or Constant Current Reduction (CCR) has been used to power light emitting devices however the difficulty with such a technique is to obtain high efficiency from the driver output stages as they are usually implemented with linear power supplies or the dynamic dimming range is not high (1:100 or 1:200). In addition, linear power supplies suffer from efficiency drops as the driver system input voltage deviates from that of the voltage required to power the emitting device(s). Therefore, the bigger the voltage difference the more power is wasted as heat across the linear power supply components which, in turn, can cause early failure of components and reduces overall driver lifetime and efficiency.

Further current driving methods are highlighted in a variety of industry literature to include Pulse Frequency Modulation (PFM) that fixes the pulse width and varies the frequency and variants such as Pulse Density Modulation (PDM), Delta Sigma Modulation (DSM) and Stochastic Signal Density Modulation (SSDM) all of which enable dimming to one degree or another.

Irrespective of the output drive current technique a key feature of driving solid-state light sources is the ability to dim the light emitting device(s) to very low intensity levels using precise current control within an illumination system containing a single wavelength/colour, multiple discrete wavelengths/colours, broadband wavelength (white) or a combination of broadband and single wavelength(s). A significant issue of the latest generation of (O)LED devices is that their efficiency to produce light from electrical current is so high that even at very low levels of current ie; 1-10 mA the light being emitted is considerably brighter than desired in many applications due to the sensitivity of the human eye. Many of the latest O(LED) devices can be operated with forward currents up to 36 A (eg; Luminous Devices Inc LEDs) and so a wide dynamic dimming range is required in order to provide smooth and accurate dimming at all light levels.

The majority of solid state lighting power control systems are designed to offer fixed current or output voltage parameters in order to maximise total system efficiency. For example, the majority of LED drivers today are categorised by the maximum forward current eg; 350 mA, 700 mA or 1000 mA operating over a defined output voltage range eg; 30-48V. These topologies are inflexible such that if different (O)LED light emitting device(s) are used with varying characteristics the performance of the power control system will at best be altered significantly but at worst not function correctly at all. A further aspect of the present invention relates to improvements in methods and apparatus to optimise the efficiency and flexibility of the power control circuit to the parameters of the light source(s) connected enabling embodiments to optimise performance, lifetime and widen the scope of use.

Furthermore where the illumination system fixture requires independently controlled light source channels such as in Red, Green, Blue and Amber the actual power used across all of the channels is significantly less than the maximum power for the combined channels and this results in the driver system operating at less than optimal performance. A further aspect of the present invention relates to dynamically sharing of power across multiple output channels controlling different light source(s) to optimise the output power of the power control circuit.

Typical power control topologies employed to deliver power to light source(s) include:

Linear Regulators: The linear regulator is the basic building block of nearly every power supply used in electronics. The IC linear regulator is very easy to implement.

Switch Mode Power Supplies (SMPS): are an electronic power supply incorporating a switching regulator in order to be highly efficient in the conversion of electrical power.

There are three basic types of linear regulator designs used in electronics:
1. Standard (NPN Darlington) Regulator
2. Low Dropout or LDO Regulator
3. Quasi LDO Regulator SMPSs can be classified into four types according to the input and output waveforms:

AC in, DC out: rectifier, off-line converter input stage
DC in, DC out: voltage converter, or current converter, or DC to DC converter
AC in, AC out: frequency changer, transformer, phase converter
DC in, AC out: inverter Furthermore, switched-mode power supplies can be classified according to the switching circuit topology. The most important distinction is between isolated converters and non-isolated ones. Typical non-isolated circuit topologies include Buck, Boost, Buck-Boost, Split-Pi, Cuk, SEPIC, Zeta and Charge pump types. Typical isolated circuit topologies include Flyback, Ringing Choke Convertor, Half-forward, Forward, Resonant Forward, Push-Pull, Half-Bridge, Full-Bridge, Resonant Zero Voltage Switched and isolated Cuk.

The two types of regulators have their different advantages:

Linear regulators are best when low output noise (and low RFI radiated noise) is required
Linear regulators are best when a fast response to input and output disturbances is required.
At low levels of power, linear regulators are cheaper and occupy less printed circuit board space.
Switching regulators are best when power efficiency is critical except linear regulators are more efficient in a small number of cases (for example if the complexity of the switching circuit and the junction capacitance charging current means a high quiescent current in the switching regulator).
Switching regulators are required when the only power supply is a DC voltage, and a higher output voltage is required.
At high levels of power (above a few watts), switching regulators are cheaper (for example, the cost of removing heat generated is less).

The prior art circuit in FIG. 1a gives an example of a typical buck power stage controller schematic usually employed to power solid-state light emitting device(s). During normal operation of the buck power stage, Q1 is repeatedly switched on and off with the on and off times governed by the control circuit. This switching action causes a train of pulses at the junction of Q1, CR1, and L which is filtered by the L/C output filter to produce a DC output voltage, VO.

A power stage can operate in continuous or discontinuous inductor current mode. Continuous inductor current mode is characterized by current flowing continuously in the inductor during the entire switching cycle in steady state operation. Discontinuous inductor current mode is characterized by the inductor current being zero for a portion of the switching cycle. It starts at zero, reaches a peak value, and returns to zero during each switching cycle. It is very desirable for a power stage to stay in only one mode over its expected operating conditions, because the power stage frequency response changes significantly between the two modes of operation.

The voltage conversion relationship for the continuous conduction mode buck power stage shows how the output voltage depends on duty cycle and input voltage or, conversely, how the duty cycle can be calculated based on input voltage and output voltage.

In continuous conduction mode, the Buck power stage assumes two states per switching cycle. The ON state is when Q1 is ON and CR1 is OFF. The OFF state is when Q1 is OFF and CR1 is ON. A simple linear circuit can represent each of the two states where the switches in the circuit are replaced by their equivalent circuits during each state. The circuit diagram for each of the two states is shown in FIG. 1b and 1c.

The duration of the ON state is $D \times T_S = T_{ON}$ where D is the duty cycle, set by the control circuit, expressed as a ratio of the switch ON time to the time of one complete switching cycle, Ts. The duration of the OFF state is called $T_{OFF}$. Since there are only two states per switching cycle for continuous mode, $T_{OFF}$ is equal to $(1-D) \times T_S$. The quantity $(1-D)$ is sometimes called D'. These times are shown along with the waveforms in FIG. 2.

Referring to FIG. 1b, during the ON state, Q1 presents a low resistance, RDS(on), from its drain to source and has a small voltage drop of $V_{DS} = I_L \times RDS(on)$. There is also a small voltage drop across the dc resistance of the inductor equal to $I_L \times R_L$. Thus, the input voltage, $V_I$, minus losses, $(V_{DS} + I_L \times R_L)$, is applied to the left-hand side of inductor, L. CR1 is OFF during this time because it is reverse biased. The voltage applied to the right hand side of L is simply the output voltage, $V_O$. The inductor current, $I_L$, flows from the input source, $V_I$, through Q1 and to the output capacitor and load resistor combination. During the ON state, the voltage applied across the inductor is constant and equal to $V_I - V_{DS} - I_L \times R_L - V_O$. Adopting the polarity convention for the current $I_L$ shown in FIG. 1, the inductor current increases as a result of the applied voltage. Also, since the applied voltage is essentially constant, the inductor current increases linearly. This increase in inductor current during $T_{ON}$ is illustrated in FIG. 2. The amount that the inductor current increases can be calculated by using a version of the familiar relationship:

$$V_L = L \times \frac{di_L}{dt} \Rightarrow \Delta I_L = \frac{V_L}{L} \times \Delta T$$

The inductor current increase during the ON state is given by:

$$\Delta I_L(+) = \frac{(V_I - V_{DS} - I_L \times R_L) - V_O}{L} \times T_{ON}$$

The quantity, $\Delta I_L$, is referred to as the inductor ripple current.

Referring to FIG. 1c, when Q1 is OFF, it presents a high impedance from its drain to source. Therefore, since the current flowing in the inductor L cannot change instantaneously, the current shifts from Q1 to CR1. Due to the decreasing inductor current, the voltage across the inductor reverses polarity until rectifier CR1 becomes forward biased and turns ON. The voltage on the left-hand side of L becomes $-(V_d + I_L \times R_L)$ where the quantity, $V_d$, is the forward voltage drop of CR1. The voltage applied to the right hand side of L is still the output voltage, $V_O$. The inductor current, $I_L$, now flows from ground through CR1 and to the output capacitor and load resistor combination. During the OFF state, the magnitude of the voltage applied across the inductor is constant and equal to $(V_O + V_d + I_L \times R_L)$. Maintaining the same polarity convention, this applied voltage is negative (or opposite in polarity from the applied voltage during the ON time). Hence, the inductor current decreases during the OFF time. Also, since the applied voltage is essentially constant, the inductor current decreases linearly. This decrease in inductor current during TOFF is illustrated in FIG. 2.

The inductor current decrease during the OFF state is given by:

$$\Delta I_L(-) = \frac{V_O + (V_d + I_L \times R_L)}{L} \times T_{OFF}$$

This quantity, $\Delta I_L(-)$, is also referred to as the inductor ripple current. In steady state conditions, the current increase, $\Delta I_L(+)$, during the ON time and the current decrease during the OFF time, $\Delta I_L(-)$, must be equal. Otherwise, the inductor current would have a net increase or decrease from cycle to cycle which would not be a steady state condition. Therefore, these two equations can be equated and solved for $V_O$ to obtain the continuous conduction mode buck voltage conversion relationship.

Solving for $V_O$:

$$V_O = (V_I - V_{DS}) \times D - V_d \times (1-D) - I_L \times R_L$$

In the above equations for $\Delta I_L(+)$ and $\Delta I_L(-)$, the dc output voltage was implicitly assumed to be constant with no AC ripple voltage during the ON time and the OFF time.

The above voltage conversion relationship for $V_o$ illustrates the fact that $V_O$ can be adjusted by adjusting the duty cycle, D, and is always less than the input because D is a number between 0 and 1. A common simplification is to assume $V_{DS}$, $V_d$, and $R_L$ are small enough to ignore. Setting $V_{DS}$, $V_d$, and $R_L$ to zero, the above equation simplifies considerably to:

$$V_O = V_I * D.$$

To relate the inductor current to the output current, referring to FIGS. 1 and 2, note that the inductor delivers current to the output capacitor and load resistor combination during the whole switching cycle. The inductor current averaged over the switching cycle is equal to the output current. This is true because the average current in the output capacitor must be zero. In equation form, we have:

$$I_{L(Avg)} = I_O$$

Although buck regulators and other switching topologies can be operated in discontinuous conduction modes the preferred operation for the majority of drivers within the marketplace is the continuous conduction mode. Therefore, switching topologies are not suitable for precise or repeatable current control at low forward currents and the lowest current limit of a system is determined by the switching speed (or minimum pulse width) achieved by the MOSFET switching device. In order to improve the dynamic current range of switching devices one method set forth in US patent 2009/0302779A1 combines an analogue feedback signal into a switching buck stage from 100% current dimming down to approximately 10% current with a PWM varying duty cycle to dim from 10% to 0%. Although this technique achieves a wider dynamic dimming range compared to a standard switching technique there are still pulses in the current through the light emitting device(s) load and maintains the majority of disadvantages attributed to the PWM dimming technique at lower currents. Also the circuit topology described is configured such that it is not possible to operate said power system in a common anode topology for more than one light emitting device output. In addition, the circuit topology described is not able to bond one or more output channels together to increase total (O)LED output current. A further disadvantage of US patent 2009/0302779A1 is that the design does not contain fault tolerant error protection so if the anode terminal is shorted to ground or to the cathode of another output connector the switching IC or MOSFET would fail rendering the power controller inoperable.

Further improvements over US patent 2009/0302779A1 have been made whereby the analogue control has been integrated into a single semiconductor IC such as the National Instruments LM3414. The LM3414 utilises two control inputs to modulate LED brightness as shown by the simplified circuit schematic in FIG. 3. An analog current control input, IADJ, is provided so the LM3414 can be adjusted to compensate for (O)LED manufacturing variations and/or temperature correction whilst the PWM output functions by shorting out the (O)LED with a parallel switch allowing high PWM dimming frequencies using the DIM input. Further improvements include common anode capabilities and operation without the need for an external sense resistor to improve efficiency.

The LM3414 operates in a continuous conduction mode and is able to remove the current sense resistor from the design by assuming the average output current of the topology is found half way through the ON or OFF switching period as shown by the $I_o$ dashed line in FIG. 2. Although this method is approximately related to the output current it is not an exact representation and if there are any non-linearity's in the inductor current $I_L$ or a sample timing issue this assumption is not representative of the average output current. It is also important to note the minimum output current achievable within continuous conduction switching circuits is equal to 50% of the system ripple current or $\Delta I_L/2$ otherwise the system will enter into a discontinuous conduction mode. In order to reduce ripple current of the power controller there are several techniques that can be employed individually or combined including:

Increase the switching frequency
Increase the capacitance on the driver output stage
Change the inductance of the inductor The switching frequency of the output stage is usually determined during the design phase and is calculated according to the size of components, efficiency of design and EMC/EMI noise requirements. If the switching frequency is too high there are switching losses which reduce the overall efficiency of the stage and EMC/EMI design becomes more complex. Increasing the capacitance on the output stage means bulkier components and if the output voltage is high eg>20V then component costs increase. If the capacitance values exceed a few micro Farad then electrolytic capacitors are required which have shorter lifetimes and are highly temperature dependant compared to ceramic or film based capacitors. Increasing the inductance values of the energy storage component in a switching topology results in higher DC resistances in the inductor which results in lower efficiencies overall and the maximum current of the driver output stage is reduced as the inductance increases for the same size inductors. Therefore, such switching designs are usually limited to being fixed once into production.

In addition, the LM3414 still suffers from the ability to channel bond multiple outputs, dim the output current in an analogue (or non PWM) fashion to low currents (The LM3414 datasheet indicates a minimum analogue dimming current of approximately 100 mA can be achieved) and cannot tolerate miss-wiring of the (O)LED outputs potentially resulting in catastrophic failure of the driver stage in application.

Consequently, linear regulators offer simple design and less EMI issues compared to switching power topologies however their efficiency, size and heat generation limit their scope to lower power applications. A linear regulator provides the desired output voltage by dissipating excess power in ohmic losses (e.g., in a resistor or in the collector-emitter region of a transistor in its active mode). A linear regulator regulates either output voltage or current by dissipating the excess electric power in the form of heat, and hence its maximum power efficiency is voltage-out/voltage-in since the volt difference is wasted.

Switching power supplies are approximately 80%-95% efficient. Higher efficiency usually is an advantage, because heat normally is considered to be wasted energy (at the least) and potentially damaging to nearby electronic components. Like other types of power supplies, an SMPS transfers power from a source like the electrical power grid to a load while converting voltage and current characteristics. An SMPS is usually employed to efficiently provide a regulated output voltage, typically at a level different from the input voltage.

Unlike a linear power supply, the switching transistor or MOSFET of a switch mode power regulator oscillates very quickly (typically between 50 kHz and 4 MHz) between full-on and full-off states, which minimizes wasted energy. Voltage or current regulation is provided by varying the ratio of on to off time. In contrast, a linear power supply must dissipate the excess voltage to regulate the output. This higher efficiency is the chief advantage of a switch-mode power supply.

Switching regulators are used as replacements for the linear regulators when higher efficiency, smaller size or lighter weight are required. They are, however, more complicated, their switching currents can cause electrical noise problems if not carefully suppressed, and simple designs may have a poor power factor.

SUMMARY OF THE INVENTION

In light of the previously discussed disadvantages of power control topologies there is the need in the art for a hybrid power controller for solid-state lighting devices which have the following benefits:

Can be used to control the intensity (or colour) of the light emitting devices(s) attached to the hybrid power control system by actuating current through the light emitting device(s). The hybrid power controller is capable of controlling the light emitting device(s) current(s) using any current waveform or dimming method without the need to change circuit design.

Can operate one or more driver output stages in a standard or common anode wiring arrangement to enable flexible fixture connection during application to the hybrid power control system.

Capable of bonding one or more output drive stages together to increase and extend the maximum forward current range to the light emitting device loads.

Provides a highly configurable and optimised hybrid power system with the ability to fix the switching frequency over a wide range of values or to provide a continuously variable switching frequency or any combination of frequency control.

Provides a wide dynamic current dimming range from a few micro amps to hundreds of amps to offer superior dimming or colour mixing performance.

Offers high efficiency power output stages of up to 99% efficiency.

Increases the lifetime of the output drive stage(s) by enabling long-life solid-state capacitors on the (O)LED outputs instead of the bulky, temperature sensitive electrolytic capacitors usually found.

Provides dynamic power control when one or more output drive stages are used to improve overall power efficiency and maximise the hybrid power control system supply loading.

To provide a robust, high reliability power control system for a wide variety of lighting applications enabling short circuit, open circuit, under voltage, over voltage, over power and thermal protection to be implemented with minimal components.

Provides a fast response to start-up over current modes associated with switch mode regulators to ensure (O)LED light emitting devices do not catastrophically fail if plugged into a power stage that is already on or during start-up.

Provides low ripple output current characteristics with the ability to change the ripple current characteristic in real-time.

Offers real-time measurement and feedback of the current, voltage and hence power of the attached light source(s).

Provides true non-linear and logarithmic dimming performance.

Increased absolute current accuracy by combining switch mode power supply and linear regulator topologies independently or concurrently.

According to a first aspect of the invention, there is provided a hybrid power control system for providing dynamic power control to illumination systems comprising:

a power source to supply any one of a range of AC or DC voltages;

a light emitting device;

one or more linear and switch mode regulator circuits combined to dynamically control current, voltage and power to the illumination system;

a microprocessor or other integrated circuit device to receive and send control information in order to regulate the power to the light emitting device;

one or more output drive stage(s) capable of delivering a wide dynamic current range, channel bonding and protection circuitry compatible with standard or common anode illumination systems.

By incorporating a hybrid power control system that combines a linear and switched mode regulator it is possible to provide current and hence power to one or more attached light emitting device(s) with a vastly extended dynamic range enabling a wide range of different light emitting devices including single die emitter packages, single array packages containing multi die emitters or multiple packages to be powered using the same driver output stages. The hybrid power control system can be highly efficient and robust.

The hybrid power control system is able to offer extremely high efficiency across the whole power range of an output drive stage as it can utilise the switching regulator to power the light emitting device at higher forward currents (or power) and switch to the linear regulator at lower forward currents (or power). The efficiency of the hybrid power control system output drive stage is able to utilise the best efficiency power stage according to the power demand on the output stage thus maximising the efficiency across the whole dimming current (or power) range. As described previously switching regulators offer high efficiencies (80%-99%) as output power is increased however as the power is decreased the stages become less efficient due to the quiescent power required by the switching components therefore the use of the linear regulator at lower forward currents (or power) improves the overall efficiency characteristics of the output drive stage as it is more efficient at low power.

Light emitting devices currently available may range from a few hundred milliwatts of power right up to a few hundred or thousands of watts depending on the configuration of the illumination system. Each of the light emitting devices within the illumination systems require different forward voltages and forward currents in order to operate correctly and the present invention enables the output drive stage to be easily configured using a microprocessor (or similar device) making it more suitable to drive a greater range of illumination systems. This offers a significant advantage to lighting fixture manufacturers as they are able to hold less driver inventory in stock as less models are required to cover a wider range of illumination fixtures.

Combining the unique features of both linear and switching regulators within an output driver stage enable a very wide dynamic dimming (or power) range to be achieved and it is possible to have a range of 1 to 4294967296 ($2^{32}$ using 32 bits) range. Although a $2^8$ bit or 256 dynamic range is fine for many lighting applications there is a growing requirement to increase this to at least 16-bit ($2^{16}$ or 65535) dimming (or power) steps especially with white light applications. Increased dimming (or power) resolution enables illumination systems to offer exponential dimming curves that are pleasing to the human eye and mimic the dimming effects seen by traditional light sources such as incandescent bulbs. The present invention enables the precise linear or non-linear dimming of light emitting devices to very low illumination levels irrespective of drive current profile through the light emitting devices.

The configuration of the present invention enables illumination system manufacturers to achieve a high degree of flexibility in designing the connecting cables from the hybrid power control system to the light fixture incorporating the light emitting device(s) as standard or common anode arrangements can be used without the need to change the output drive stage topology. This provides the manufacturer with flexibility to design the fixture as less cable cores can be used between the light fixture and the power controller if designed using a common anode topology. If however the fixture to power controller distance is great then a standard connection topology may be used as this reduces the voltage (or power) loss in the cables connecting the controller and light fixture as compared to a common anode arrangement.

A further advantage of the present invention is that it offers a high degree of protection against damage due to mis-wiring of the output connectors on the hybrid power control system. Traditional switching regulators or control systems for solid state lighting do not offer protection against wiring the anode connection of the switching device to ground or another switching device however the output drive stage topology taught within the scope of the present invention enables the output connectors for each drive stage to be mis-wired without causing catastrophic failure to the output drive stage components.

Another advantage of the present invention is that when multiple output drive stages are contained within the hybrid control system it is possible to dynamically change the power in each channel according to a maximum power level set by the hybrid control system. This enables for example the maximum output of the combined driver stages to be set to the maximum output power of an AC/DC switching regulator that powers the output stages. This dynamic power control enables the application to operate at any pre-defined power up to the maximum of the AC/DC power supply and thus maximising the overall efficiency of the hybrid power control system at the same time as maximising the light emitted from the illumination control system.

A further advantage is that, by controlling the voltage and type of voltage supplied by the power source in response to the type of light emitting device(s) used within the illumination system it is possible to optimise the overall lumens per watt efficiency of the illumination system. For example, today the majority of LEDs manufactured utilise DC voltage to energise which may require an AC voltage to DC voltage switch mode regulator however it is possible to directly connect AC driven LEDs which do not necessitate the need for an AC to DC switch mode regulator. Furthermore the power source may be obtained from a DC generator such as a Photovoltaic (solar) cell and therefore only a DC/DC switching regulator may be required increasing the overall efficiency of the hybrid power control system.

Other preferred features of the invention are defined in the dependent claims and may be further discussed hereinafter.

In one embodiment of the invention, a lighting controller for (O)LED products includes the combination of linear and switching regulator power supplies within a dynamic power control system configured in a buck (or other suitable) circuit topology to obtain significantly improved dimming performance at low load currents whilst increasing the dynamic current range to operate from micro-amps to multiple Amps across one or more output drive stage channels. The said embodiment includes the ability to dynamically share power across multiple drive stage channel outputs in a robust and reliable method retaining the ability to bond channels to increase effective current output of the controller or to implement common anode features to reduce the need of extra wiring between the controller and the lighting emitting device load.

A preferred embodiment of the present invention includes a means for controlling the power factor and the quality of power to the illumination system. Power factor is defined herein as the ratio of real power to apparent power. Power factor is a simple way to determine how much of the current contributes to real power in the device load. A power factor of one (unity or 1.00) indicates that 100% of the current is contributing to power in the device load while a power factor of zero indicates that none of the current contributes to power in the device load. Preferably, the power factor of the switch mode power supply unit used within one embodiment of the illumination system is ≥0.80, more preferably ≥0.98, so that, once the power is delivered to the device load, the amount of current returned is minimised. This is desirable because:

1. The power transmission lines or power cord will generate heat according to the total current it carries and the resistance of the conductor in the cord resulting in unnecessary power loss 2. Additional cost may be incurred in supply power as power factor correction at the utility supply may have to be provided resulting in additional charges and wasted energy in the supply chain.

A power factor correction (PFC) circuit is preferably employed in the invention when used in AC signal in to DC signal out topologies to precisely control the input current on an instantaneous basis, to match the waveshape of the input voltage. The PFC circuit may contain active and/or passive power factor correction to ensure the illumination system has a power factor correction greater than 0.8.

The PFC circuit not only ensures that no power is reflected back to the power source, it also eliminates the high current pulses associated with conventional rectifier filter input circuits.

The quality of power delivered to the illumination system is critical to the overall lifetime characteristics of the system. For example, significant voltage spikes that occur from the power providers transmission lines could result in partial or catastrophic failure of the light emitting source (in the case of a direct AC LED) or the hybrid power control system (in the case of a DC LED system). Therefore in a preferred embodiment of this invention a power line conditioner topology is utilised to improve the quality of the power that is delivered to the illumination system. Power or line conditioners regulate, filter, and suppress noise in AC or DC power for sensitive solid state equipment. Power conditioners typically consist of voltage regulators in combination with output isolation transformers and transient voltage suppression circuitry. They provide electrical isolation and noise and spike attenuation to ensure the quality and consistency of power to sensitive high technology equipment. The voltage regulator specifications will include a suitable power rating, input voltage, output voltage, voltage regulation accuracy, phase, and frequency.

A further preferred aspect of the present invention is to utilise a light emitting device that contains at least one high power (>0.1 Watt) (O)LED emitter package that may contain one or more light emitting elements. The (O)LED emitter package may be of a type that can be energised using either a DC or AC voltage depending on user or system requirements. The (O)LED emitter package(s) may be arranged into an ordered or pseudo-ordered array of light emitters in order to optimise the light exiting the illumination system.

Preferably, the hybrid power control system is able to utilize a microprocessor, programmable system on a chip (PSoC), FPGA (Field Programmable Gate Array), ASIC (Application Specific Integrated Circuit) or any other alternative integrated circuit device that is capable of computing information or data to calculate control parameters of the light emitting device. Furthermore, said hybrid power control system is preferably able to utilize and implement feedback and feedforward control systems to rapidly react to information provided by feedback sensors in order to modulate the characteristics of the light emitting device. Such feedback sensors could include but is not limited to optical, colour, temperature, timer, occupancy, current, voltage, power, gas, magnetic, vibration, acceleration, velocity, frequency and biological means of monitoring or detecting environmental conditions.

In another preferred aspect of the invention, said illumination system incorporates light emitting device(s) comprising single or multiple light emitting packages containing one or more light emitting elements capable of radiating a single colour, which includes white, or a plurality of colours. The light emitting device(s) may comprise one or more (O)LED strings. In at least one embodiment, the light emitting device comprises at least two (O)LED strings comprising a string of (O)LEDs that emit a first colour wavelength spectrum and a string of (O)LEDs that emit a second colour wavelength spectrum. In one preferred arrangement, the light emitting source comprises at least four (O)LED strings, typically a string of (O)LEDs that emit a first colour, for example red, a string of (O)LEDs that emit a second colour, for example green, a string of (O)LEDs that emit a third colour, for example blue and a string of (O)LEDs that emit a fourth colour for example white. Each (O)LED string may comprise any number of (O)LEDs, however, in typical light emitting sources there are 12 (3× Red, 3× Green, 3× Blue, 3 White) or 48 (12× Red, 12× Green, 12× Blue, 12× White) (O)LEDs. This has particular benefit for colour illumination systems however additional strings of different coloured (O)LEDs would provide the illumination system with a configurable and uniform power spectral density light output. Alternatively, the light emitting device comprises one or more white LED strings or LED strings having other colour LEDs, for example orange, amber or red LEDs to enable precise control of the light emitting device Colour Rendering Index, Quality Colour Scale (QCS) and Correlated Colour Temperature (CCT) outputs.

In another preferred aspect of the invention, said power source could be either or a combination of a high or low voltage AC or DC energy source. The AC power supply range may vary from a few voltages of AC input to 1000 volts of alternating current whilst the DC voltage input may vary from a few volts of direct current to more than 1000 volts DC depending on the electrical and electronic configuration of the hybrid power control system.

In another preferred aspect of the invention, said linear regulator describes one or more of the following design topologies:
  Voltage regulator
  Resistor current source
  Active current source
  JFET, PFET or NFET current source
  Transistor current source
  Widlar or Wilson current source
  Zener or series regulator
  any other type of voltage or current source topology The linear regulators incorporated into the output drive stages may be controlled directly or indirectly by the microprocessor or equivalent integrated circuit to provide a specified current (or power) to the light emitting device connected to an output drive stage.

In another preferred aspect of the invention, the said topologies provide safety, component value and temperature variation compensation methods including one or more of the following features: current limiting, foldback, thermal shutdown, safe area protection, over current, short circuit or output power protection.

In another preferred aspect of the invention, said switch mode power supplies are either isolated or non-isolated types and describes one or more of the following input and output waveform topologies:
  AC signal in, DC signal out
  DC signal in, DC signal out
  AC signal in, AC signal out
  DC signal in, AC signal out The power source may be powered by a power supply or transformer that is preferably attached directly or remotely to the illumination system. The power source may be an AC to DC power supply, a DC to DC power supply, an AC to AC power supply or any other suitable power supply.

In another preferred aspect of the invention, said switch mode regulator topology can provide one or more DC output voltages or currents through one or more of the following methods:
  Flyback convertor
  Ringing Choke convertor
  Half-Forward convertor
  Forward convertor
  Resonant forward convertor
  Push-pull convertor
  Half-Bridge convertor
  Full-Bridge convertor
  Resonant, zero voltage switched convertor
  Isolated Cuk convertor
  any other type of switch mode topology In another preferred aspect of the invention, said AC to DC topology may include one or more of the following features:
  Input and output power terminal blocks
  Excess input voltage protection means
  Input noise filter means
  Rectifier and current limiter
  Power Factor Correction
  Power bank
  Output current limiter, power limiter, voltage regulator, thermal shutdown, short circuit protection
  Output noise and ripple filter
  Standby, low power or shutdown means The standby, low power or shutdown feature of the switch mode power supply enables significantly less power to be consumed by the illumination system when it is not being used but still connected to the power source. Typically the standby power consumed by advanced illumination systems is below 1 W. When the illumination system is in shutdown mode the power to the light emitting device(s) is stopped and only a small amount of power is used to enable the microprocessor in the control system that is able to wake up the hybrid power control system when a control signal is used to activate it. Such standby features are highly desirable in modern lighting schemes as it reduces the total amount of energy consumed even when the illumination systems are switch off. For example, LED streetlights still consume power during the daytime even though the LEDs are switched off because of the energy consumed by parts of the switch mode power supplies.

In another preferred aspect of the invention, the said topologies provide safety, component value and temperature variation compensation methods including current limiting, foldback, thermal shutdown, safe area protection, over current, short circuit or output power protection.

The safety features enable the illumination system to be installed quickly by an installer without harm as mis-wired cables between the output drive stage(s) and illumination system light emitting device(s) will not cause catastrophic failure of the hybrid power control system when a power source is connected and energised. Such safety features increase confidence of the installer in such systems as wiring cables can often take place during installation of illumination systems. In order to improve accuracy of the current (and power) delivered by the output drive stage temperature compensation of the switch mode regulator is important as component values may drift with ambient or operating temperature changes and it is important that the hybrid power controller incorporates temperature compensation features where required.

Another preferred aspect of the invention provides a means for a DC to DC switch mode regulator to provide one or more DC output voltages or currents using either continuous conduction or discontinuous conduction mode through one or more of the following methods:
Buck
Boost
Buck-boost
Split-pi
Cuk
SEPIC
Zeta
Charge pump
any other type of DC to DC switching topology The choice of the DC to DC switching regulator topology will be determined by the magnitude of the input and output DC voltages required by the hybrid power control system. For example, if the input voltage is greater than the output voltage required the switching regulator topology could be a Buck or Buck-boost type with the Buck having a better overall efficiency than the Buck-boost topology. However, if the input voltage is less than the output voltage required the switching regulator topology could be a Boost or Buck-boost type with the Boost being preferred. However, if the input voltage varies above or below the output voltage the best switching regulator topology would be the Buck-boost. In various aspects of the invention, the most suitable switching topology would be chosen to optimize the design and overall efficiency of the illumination system.

An important aspect of the hybrid power control system is that it is capable of measuring the output drive stage current (and power) in either a continuous conduction or non-continuous conduction mode using the advanced microprocessor or integrated circuit device and control sensor values. Utilizing a microprocessor to control or regulate the output drive stage enables sophisticated control algorithms to be implemented in real-time.

Another preferred aspect of the invention provides a means for a switch mode regulator wherein said DC to DC topology comprises:
  an inductor, connected in series with a light emitting device;
  a switch connected in series with the inductor and light emitting device;
  a control circuit to directly or indirectly generate a control signal to modulate the ON/OFF of the switch in response to a desired light emitting device voltage or current;
  a fast flyback diode, coupled in parallel to the light emitting device and inductor for discharging the energy of the inductor through the light emitting device The flyback diode must be capable of fast switching with a small reverse recovery time otherwise it will become inefficient as the fundamental switching frequency increases resulting in the flyback diode getting hot, failing or at best reducing the efficiency of the output drive stage.

Another preferred aspect of the invention provides a means for a switch mode regulator wherein the control circuit further comprises:
  an integrated circuit, microprocessor or any other similar semiconductor means to generate the switch control signal;
  a means for measuring the current flowing through the light emitting device;
  a means for measuring the voltage present across the light emitting device;
  a means for receiving light emitting device characteristics such as light intensity, light colour, light emitting device temperature;
  a means for receiving sensor information characterising the environment in proximity to the light emitting device including temperature, ambient light intensity, ambient light colour, occupancy information amongst others;
  a means for transceiving information across a control network, sensor network or user interface;
  a means for providing component and circuit protection to a variety of possible non standard operating conditions.

In this aspect it is possible to measure the current flowing through the light emitting device using the combination of a current sense resistor in series with the light emitting device and a current shunt monitor such as the INA193A from Texas Instruments or equivalent. Using such a current shunt monitor offers particular advantages such as increased accuracy due to built-in temperature compensation, known start-up characteristics, wide common mode voltage range, high bandwidth and the ability to operate from an independent supply enabling the current shunt monitor to operate in a floating (ie; not tied to a power supply rail) topology. It is these characteristics which are vital to enable common anode operation of one or more output drive stages of the hybrid power control system.

In this aspect it is also possible to provide a further embodiment of the invention whereby the current can be measured through the light emitting device using discrete components including a high precision differential amplifier arrangement. The current measurement value can feedback into the hybrid power control system.

In this aspect of the invention it is possible to measure the voltage across the light emitting device connected to the hybrid power control system using a simple emitter-follower topology connected in parallel with the light emitting device. The emitter follower may be designed to use a simple transistor such as the BC846C with input and output bias resistors to appropriately set the gain of the emitter follower arrangement which can then be used to provide a voltage feedback value to the hybrid power control system.

In this aspect of the invention it is therefore possible to measure the actual power consumed by the output drive stage by simply multiplying the feedback values of the current and voltage monitors. The power measured across one or more output drive stages can then be utilised in a dynamic power control algorithm to limit or to share power across the total output stages in any manner prescribed by a user or predetermined set of conditions.

In this aspect it is also possible to provide a further embodiment of the invention whereby sensor values or signals, representative of the light emitting device(s) contained in the illumination system, are fed back to the microprocessor or equivalent system executing software algorithms to regulate the output of the hybrid power control system. In this embodiment such values may be obtained from one or more of the following sensors:
  a sensor to measure the intensity of the illumination system;
  a sensor to measure the power spectral density of the illumination system;
  a sensor to measure the correlated colour temperature of the illumination system;
  a sensor to measure the colour rendering index of the illumination system;
  a sensor to measure the temperature of the light emitting device(s) within the illumination system.

In this aspect it is also possible to provide a further embodiment of the invention whereby sensor values or signals representative of the ambient environment surrounding the illumination system are fed back to the microprocessor or equivalent system executing software algorithms to regulate the output of the hybrid power control system. In this embodiment such values may be obtained from one or more of the following sensors:

a magnetic sensor for detecting door or window opening
occupancy sensor using Infrared or microwave wavelengths
user operated wireless remote control.
ambient light intensity sensor
ambient light colour sensor
video camera sensor
temperature sensor
smoke detector
gas detector In this aspect of the embodiment the environmental temperature sensor(s) could be provided by simple NTC or PTC thermistors such as the Negative Temperature Coefficient 10 kΩ thermistor with 5% value tolerance from EPCOS model number B57371V2103J060. Furthermore, if a higher resolution temperature reading is required a digital temperature sensor such as the Maxim digital thermometer model number DS75LXU+ with a temperature reading accuracy of 2%.

Similarly, the ambient lighting sensors may contain either analogue or digital outputs suitable for reading by the hybrid control system such as the Avago Technologies analogue logarithmic ambient light sensor model APDS-9007-020.

Furthermore, high quality low cost colour sensors are readily available to be used in illumination systems such as the Avago Technologies model number ADJD-J823 digital colour controller and sensor featuring built in RGB photosensor and I2C serial interface.

Occupancy and PIR sensors such as the Panasonic AMN11112 sensor can be easily connected to the hybrid power controller in order to provide a signal to activate or deactivate the system when movement in proximity to the sensor is detected. As discussed the addition of such advanced sensor inputs into the hybrid power controller enables the energy consumption of the illumination system to be reduced further.

In order for the sensor and other control information to be used as feedback in the hybrid power control system a network needs to be established between the hybrid control system, sensors and any user interface present. The network could be both single or bi-directional depending on the devices attached. For example, digital sensors may need information such as the sensor gain to be sent from the hybrid control system whilst the detected sensor values need to be sent back to the hybrid control system. Such networks may be based on a variety of hardware bus systems such as I2C, SPI, UART, CAN, USB, IEE1394, Ethernet readily available within digital systems.

Furthermore, video cameras combined with user operated wireless remote controls such as the Microsoft® Kinect sensor device may be used not only to detect a users presence but also to interpret a users body, face or voice gesture/command in order control the illumination system connected to the hybrid power control system.

In this aspect it is also possible to provide a further embodiment of the invention whereby the environmental sensors are able to effect output of the illumination system according to the environmental conditions around it thus making the system aware of its surroundings and able to react to it.

Another preferred aspect of the invention provides a means for a hybrid power control system wherein said dynamic power control system comprises:

at least one AC to DC switch mode power supply incorporating a power standby feature for low power consumption during inactive periods of use and a means for measuring input power consumption;
one or more output driver stages containing one linear current regulator combined with one DC to DC switch mode regulator;
a means for measuring output power consumption of the one or more output stages;
a means for providing internal and external control commands to the microprocessor or other integrated circuit device from or to a sensor network, data control network or user interface;
a means for distributing power across one or more output driver stages;

In this aspect it is possible to measure the input power consumption of the hybrid power control system using a current sensor integrated circuit such as the bidirectional ACS709 model from Allegro microsystems which is capable of measuring both AC or DC currents up to 200 A in an isolated package capable of withstanding RMS voltages up to 3000. Such current sensors enable the power into the hybrid power control system to be monitored in a compact form without low insertion and power losses. Due to the isolation protection provided the current values detected at the power input may be easily sent to the microprocessor and included in the control algorithms used to control the illumination system.

Another preferred aspect of the invention provides a means for a hybrid power control system wherein said output driver stage(s) is capable of a soft start feature that utilises a linear regulator at low light emitting device currents to protect against large start-up currents associated with switch mode regulators. In this aspect the soft start function provides little stress on the light emitting devices attached as the linear regulator will place a small amount of increasing current through each output drive stage until the switch mode regulator is activated for higher currents (or power). The advantage of using the linear regulator to provide current to the light emitting device(s) is that an initial measurement of the light emitting device(s) forward voltage may be taken by the hybrid control system which can then use the value to calculate the duty cycle required when the switch mode regulator is started and to provide an accurate and fast responding output current (or power). Such a feature also enables safe plugging of the light emitting device(s) into the output drive stage(s) without failure of the (O)LED light emitting devices due to excessive transient current spikes often associated with switch mode regulators.

Another preferred aspect of the invention provides a means for a hybrid power control system wherein said linear regulator(s) and switch mode regulator(s) are combined to operate individually or concurrently over a wide light emitting device current range to increase the accuracy and efficiency of the system. In this aspect the hybrid power control system can combine the current (or power) generated by a linear regulator and switch mode regulator at any forward current (or power) range capable by the illumination system to increase the absolute accuracy of the output drive stage. The ability to modulate a small amount of bias current by the linear regulator at higher forward currents enables the combined output drive stage to have accurate current (and power) output during the activation of the switch mode regulator. For illumination systems which require an increase in current resolution and a decrease in current ripple combining the linear and switching regulator outputs across a wide current range will outweigh the minimal drop in overall efficiency of using two stages incur.

Another preferred aspect of the invention provides a means for a hybrid power control system wherein said dynamic power control system is able to dynamically configure the duty cycle and fundamental switching frequency of the one or more switch mode regulators.

Another preferred aspect of the invention provides a means for a hybrid power control system wherein said dynamic power control system is able to dynamically configure the duty cycle and fundamental switching frequency of the one or more switch mode regulators.

Another preferred aspect of the invention provides a means for a hybrid power control system wherein said dynamic power control system is able to configure the switching frequency of the one or more switch mode regulators dynamically to provide a single fundamental frequency or continuously varying fundamental switching frequency according to the desired output characteristics of the load or light emitting device(s).

In at least one embodiment, the duty cycle used within the switch mode regulator(s) in the output drive stage(s) shall have a time resolution of less than 1 nano Seconds ($10^{-9}$ seconds) and more preferably less than 200 pico Seconds ($10^{-12}$ seconds) in order to provide sufficient current and voltage (power) control.

Another preferred aspect of the invention provides a means for a hybrid power control system wherein said dynamic power control system is able to synchronise the switching frequency of the one or more switch mode regulators dynamically.

Another preferred aspect of the invention provides a means for a hybrid power control system wherein said dynamic power control system is able to provide linear or non-linear current or power profiles over a quantised time interval to the light emitting device. The current or power profiles may be selected dynamically by the user or installer of the illumination system according to the intended lighting application. Standard non-linear profiles such as the exponential human eye response curve disclosed in the international Digital Addressable Lighting Interface standard EN60929 may be stored as look-up tables or computed by the microprocessor in the hybrid power control system.

Another preferred aspect of the invention provides a means for a hybrid power control system wherein said dynamic power control system comprises a means to detect the peak or average current passing through the light emitting device to regulate the current (or power) to said light emitting device.

Another preferred aspect of the invention provides a means for a hybrid power control system wherein said dynamic power control system comprises a means to provide common anode and channel bonding capabilities between one or more light emitting device output channels such that the current detection method is floating on either a P-type or N-type switching device incorporated into the switch mode regulator topology. Switching regulator topologies can be devised upon an N-type switching MOSFET where the floating current sense monitor would be implemented in the high voltage side of the MOSFET however an alternative equivalent may be devised based upon a P-type switching MOSFET which would require the current sense monitor to be placed on the low voltage side of the MOSFET. This along with other methods of implementing switching regulators could be modified to provide common anode and channel bonding capabilities on the output drive stage.

Another preferred aspect of the invention provides a means for a hybrid power control system wherein said dynamic power control is achieved by measuring the power consumed at the interface between the output of the AC/DC switching stage and the input of the one or more DC/DC light emitting device stages.

Another preferred aspect of the invention provides a means for a hybrid power control system wherein said dynamic power control is achieved by measuring the power consumed at the output of the one or more output driver stages.

Another preferred aspect of the invention provides a means for a hybrid power control system wherein the light output characteristic of the illumination system can be controlled by one or more of the following:
the intensity of the illumination system;
the power spectral density of the illumination system;
the correlated colour temperature of the illumination system;
the colour rendering index of the illumination system;
the beam angle of the illumination system.

In at least one embodiment, the illumination system comprises a closed loop feedback system within the hybrid power control system arranged to cause the precise control of the colour, intensity, frequency, CCT, CFU, CQS and power spectral density of light emitted. The feedback means is capable of measuring temperature, current, voltage, power, intensity and colour of the light emitting device along with other environmental parameters that are measured in the vicinity of the illumination system through a sensor network.

Another preferred aspect of the invention provides a means for a hybrid power control system wherein the output drive stage(s) are capable of delivering a current to one or more light emitting device(s) with a magnitude down to 1 micro-Ampere in a controlled manner.

Another preferred aspect of the invention provides a means for a hybrid power control system wherein the output drive stage(s) are capable of operating over a wide dynamic current range with a maximum range limit selected by the microprocessor or other integrated circuit device from $2^1$ to $2^{32}$ bits.

Another preferred aspect of the invention provides a means for a hybrid power control system, wherein the output stage can deliver power to one or more light emitting devices using pulsed, non-pulsed or analogue current profiles either exclusively or combined wherein the current profile (or power) through the light emitting device may be Direct Current, Alternating Current, Pulse Width Modulation, Pulse Amplitude Modulation, Pulse Frequency Modulation, Pulse Density Modulation, Delta Sigma Modulation, Stochastic Signal Density Modulation (SSDM), Amplitude Modulation or any other current control technique known to those in the art.

Another preferred aspect of the invention provides a means for an illumination system, wherein the hybrid power control system comprises a closed loop feedback system arranged to cause the precise control of the colour, intensity, frequency, CCT, CRI, CQS and power spectral density of the illumination system.

Another preferred aspect of the invention provides a means for an illumination system wherein the feedback means is arranged to measure through a sensor network capable of measuring temperature, current, voltage, power, intensity and colour of the light emitting device along with other environmental parameters that are measured externally to the illumination system.

The feature(s) according to the different aspects of the invention may be employed separately or in combination with any other feature(s) described herein including, but not limited to, any feature(s) according to other aspects of the invention

BRIEF DESCRIPTION OF THE DRAWINGS

The present invention will now be described, by way of example, with reference to the accompanying drawings.

FIG. 1 illustrates a prior art continuous conduction mode switching regulator circuit (a) where the switching device state is On (b) and Off (c);

DETAILED DESCRIPTION OF THE EMBODIMENTS

Figure 2:
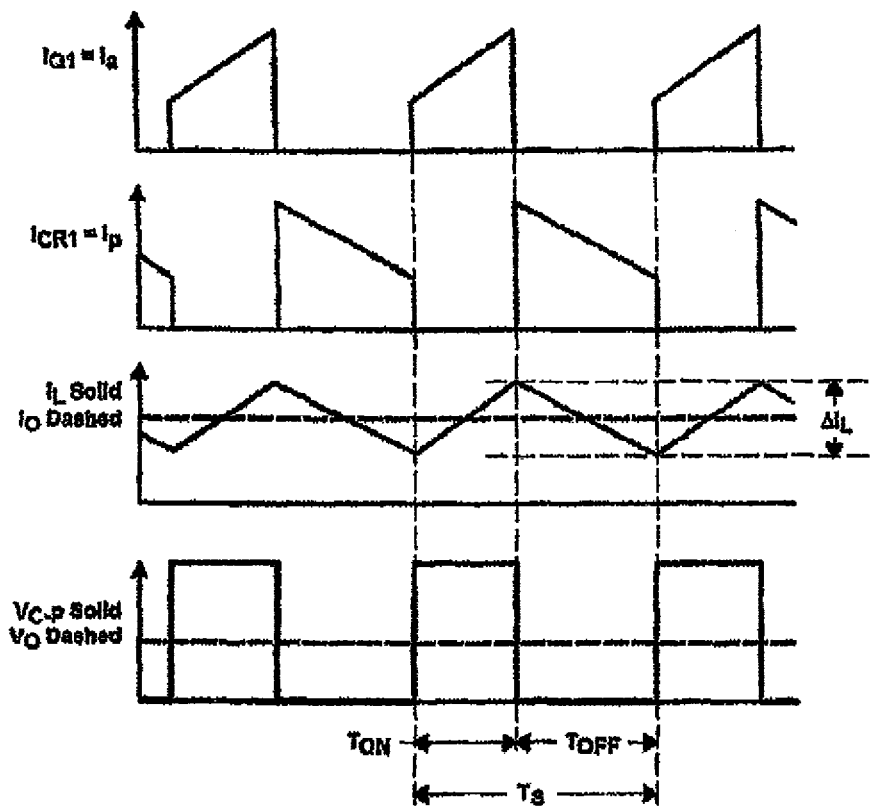
FIG. 2 illustrates the various current and voltage signals of the continuous conduction mode regulator circuits illustrated in FIG. 1.

Referring to the drawings, FIG. 1a shows a prior art continuous conduction mode switching regulator circuit incorporating a switching device (Q1) a flyback diode (CR1) an energy storage device such as an inductor (L) an output filter using a capacitor (c) and a resistor ($R_C$) and a load (R). FIG. 1b represents a schematic in the switched ON state of the circuit in FIG. 1a whilst FIG. 1c represents a schematic in the switched OFF state.

FIG. 2 illustrates the various current and voltage waveforms of the circuit highlighted in FIG. 1a as the continuous conduction mode circuit is being switched ON and OFF repeatedly.

Figure 3:
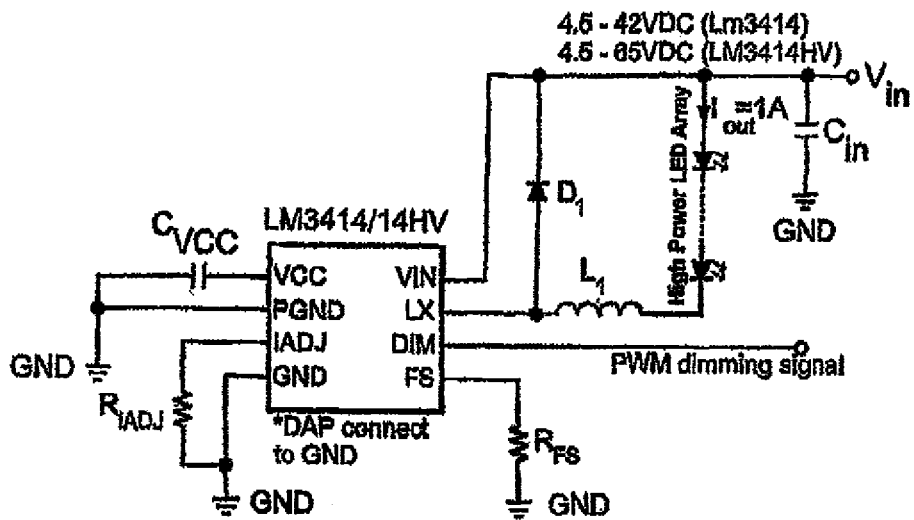
FIG. 3 illustrates a prior art switching regulator circuit with analogue and PWM dimming inputs to dim the current through LEDs.

FIG. 3 illustrates a prior art switching regulator circuit with analogue and PWM dimming inputs to dim the current through the LEDs.

Figure 4:
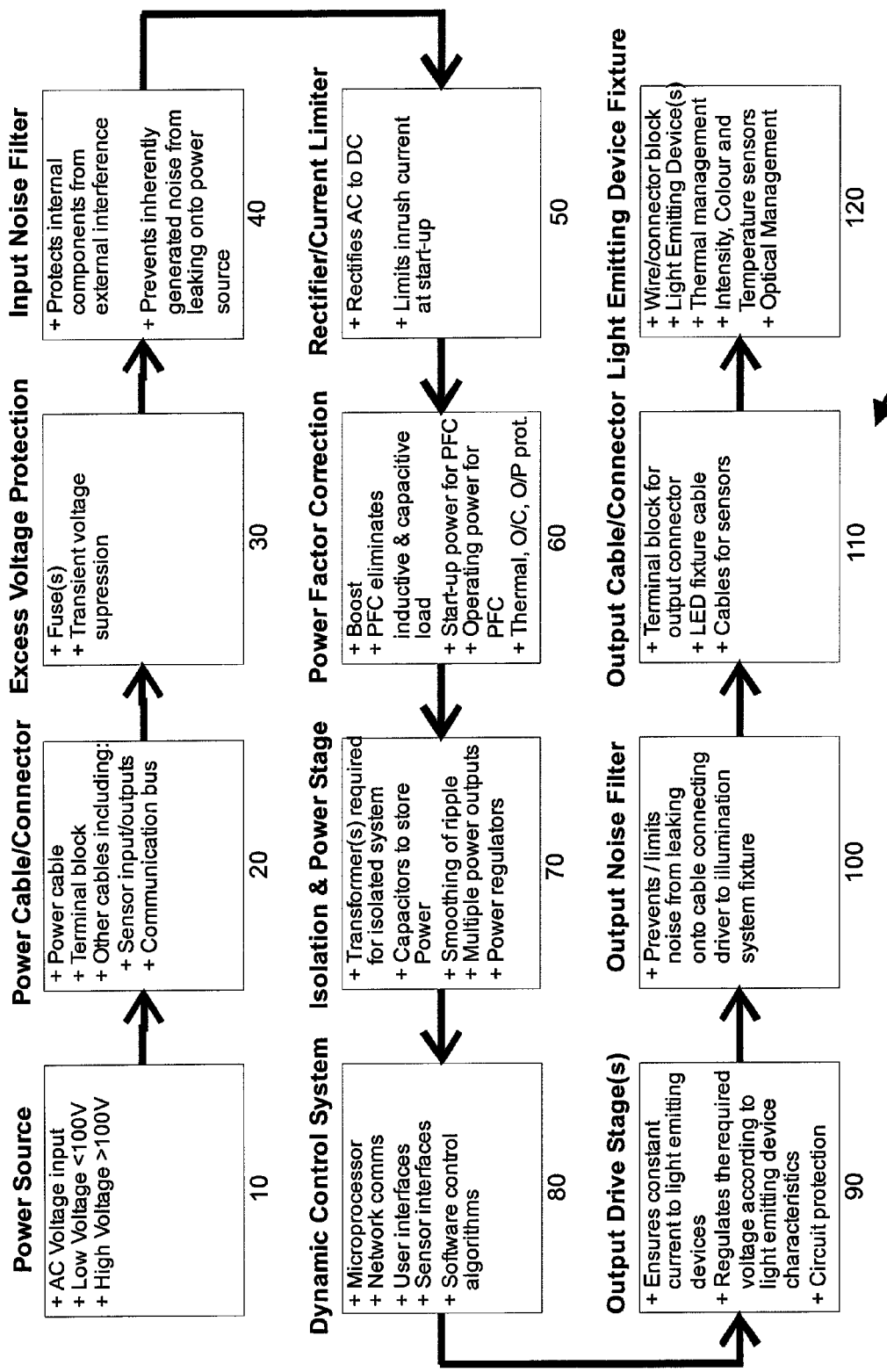
FIG. 4 illustrates a schematic diagram outlining the main parts of the illumination system of one embodiment of the invention.

FIG. 4 illustrates a schematic diagram outlining the main parts of an illumination system from input to output according to one embodiment of the present invention. As mentioned, the object of an AC to DC illumination system (1) is to supply a prescribed power in the form of an output voltage and constant current to a light emitting device fixture to modulate the light output accordingly.

This is achieved with a power source (10) being connected by a power cable (20) to a power terminal block (21) which in turn is connected to excess voltage protection (30) and an input noise filter (40) prior to rectification and current limiting (50). The rectified stage (50) is connected to a power factor correction means (60) followed by an isolation and power stage (70) providing the required parameters to enable the dynamic control system (80) to operate. The dynamic control system (80) is connected to the output drive stage(s) (90) that is in turn connected to an output noise filter (100) which ensures that constant current with a minimum of noise is given to the output connector (110) and cable (111) which a light emitting device fixture (120) is connected to.

All of the modules mentioned above comprise components that are connected to each other via one or more dedicated printed circuit boards (PCB) or cables.

Each of the modules will be explained in more detail below:

The power source module (10) of the illumination system (1) could be either a high voltage (>100V) or low voltage (<100V) AC power source and is connected by a suitably rated power cable (26) to a terminal block (21) within the power cable/connector module (20) that could be either panel mounted or PCB mounted. The terminal block (21) may be a multiple pole type to enable multiple drivers to be linked simply together. Depending on the configuration of the illumination system (1) other cables could be connected to the same or different terminal block (21) representing various sensor inputs (22) or output (23) as well as communication bus (24) for communicating instructions between the illumination system (1) and a master controller (2). The communication bus may be based on a variety of hardware or protocol systems such as I2C, SPI, UART, RS232, RS485, DMX CAN, USB, IEE1394, DMX, RDM, KNX, DALI, Ethernet readily available within digital communication systems. Other protocols may be employed.

The excess voltage protection module (30) may comprise of one or more fuses (31) in either or both power supply phase inputs to improve safety. The fuses (31) are included to protect against short circuits to earth on the respective phases, or a short circuit between phases. Furthermore, in a preferred embodiment, there is also excess voltage protection at the input that consists of transient protection. It is known that transient spikes from the power source module (10) can damage sensitive components. The best form of transient voltage suppression is to implement a transient voltage suppressor (32) which will efficiently protect the rest of the illumination system (1) from transient voltage spikes.

The input noise filter module (40) has two main functions. The first is to prevent inherently generated noise from the switching regulators within the switch mode power supply of the illumination system (1) from returning into the power source (10) grid network. There are international standards to regulate how much noise can be generated by electronic products. The second function of the input filter is to stop noise from the power source (10) grid network entering into the power supply of the illumination system (1). The filter usually contains components on both the input and output sides of the rectifier module (50).

The rectifier module (50) must be present on an AC to DC power system since most commercially available (O)LEDs are usually driven by direct current. The input side of the rectifier module (50) converts the AC power source into a DC rectified source. In a preferred embodiment, the rectifier module (50) provides a means for giving the illumination system (1) a soft-start feature by limiting the inrush current at the start-up phase. Limiting the current taken by the illumination system (1) in the start-up phase is important for determining the safe value ratings for cables, fuses and other components.

The power factor correction module (60) is a core feature of a modern AC to DC power supply as it reduces the inductive and capacitive load on the power source module (10). The PFC module (60) provides a boost in the output voltage which is an important feature to enable many light emitting devices to be driven. In one embodiment of the PFC module (60) the PFC Integrated Circuit is driven by a start-up current derived from the output stage of the rectifier module (50) and during normal operation is driven by an operating current which takes over once the PFC module (60) circuit has started up. The latest PFC integrated circuit controllers provide power factor correction close to 1 and offer over temperature, over current and over power protection on the primary side of the switch mode power supply.

The isolation and power stage (70) is usually connected to the output stage of the PFC module (60) and contains capacitors that are large enough to absorb and smooth out ripple currents exiting from the PFC module (60) whilst providing direct voltage to the dynamic control system (80) and output drive stage (90) modules. One embodiment of the isolation and power stage module (70) would provide one or more regulated voltages to the dynamic control system (80) in order to optimise the efficiency of the switch mode power supply. A further embodiment provides a transformer to provide galvanic isolation of the output from the high voltage inputs.

The dynamic control system module (80) is powered from the voltage supply outputs of the isolation and power stage module (70). One embodiment of the dynamic control system module (80) incorporates a microprocessor (81) executing software control algorithms, a means for communicating via a bus (24) with a network master controller (2), one or more user interfaces (82) and one or more sensor interfaces (83). One embodiment of the user interface (82) would include a menu keypad and LCD display to enable users to determine the output control functions of the illumination system (1).

In a one embodiment of the illumination control system (1) the output drive stage module (90) is controlled by the dynamic control system (80) to ensure a constant current and delivers a voltage that is dependent on the number of light emitting devices used within the light emitting device fixture (120). A preferred embodiment of the digital control system (80) incorporates the output drive stage module (90) to reduce the cost and size whilst increasing efficiency.

In one embodiment the output noise filter (100) includes an inductive and capacitive load which removes ripple and noise spikes at the output drive stage module (90). Since the light emitting devices require stable voltages in order not to be overloaded by high ripple voltages, the output noise filter (100) will ensure the conducted and radiated noise emissions on or from the output cable (112) connected to the light emitting device fixture (120) are attenuated.

The output cable and connector module (110) contains a terminal block for the output connector (111). The output cable (112) provides power to the light emitting device fixture (120) and also one or more cables to carry signals from sensors.

In one embodiment the light emitting device fixture (120) contains a wire or connector block (121) to provide power from the output cable (112) of the switch mode power supply, a heatsink (123) that is thermally connected to a metal core PCB containing lighting emitting devices (124) or (O)LED array substrate, a temperature sensor (125) to measure the temperature of light emitting device (124), a light intensity sensor (126) to measure the intensity of the ambient light and the output of the light emitting device (124), a colour sensor (127) to measure the colour of the light emitting device (124).

Figure 5:
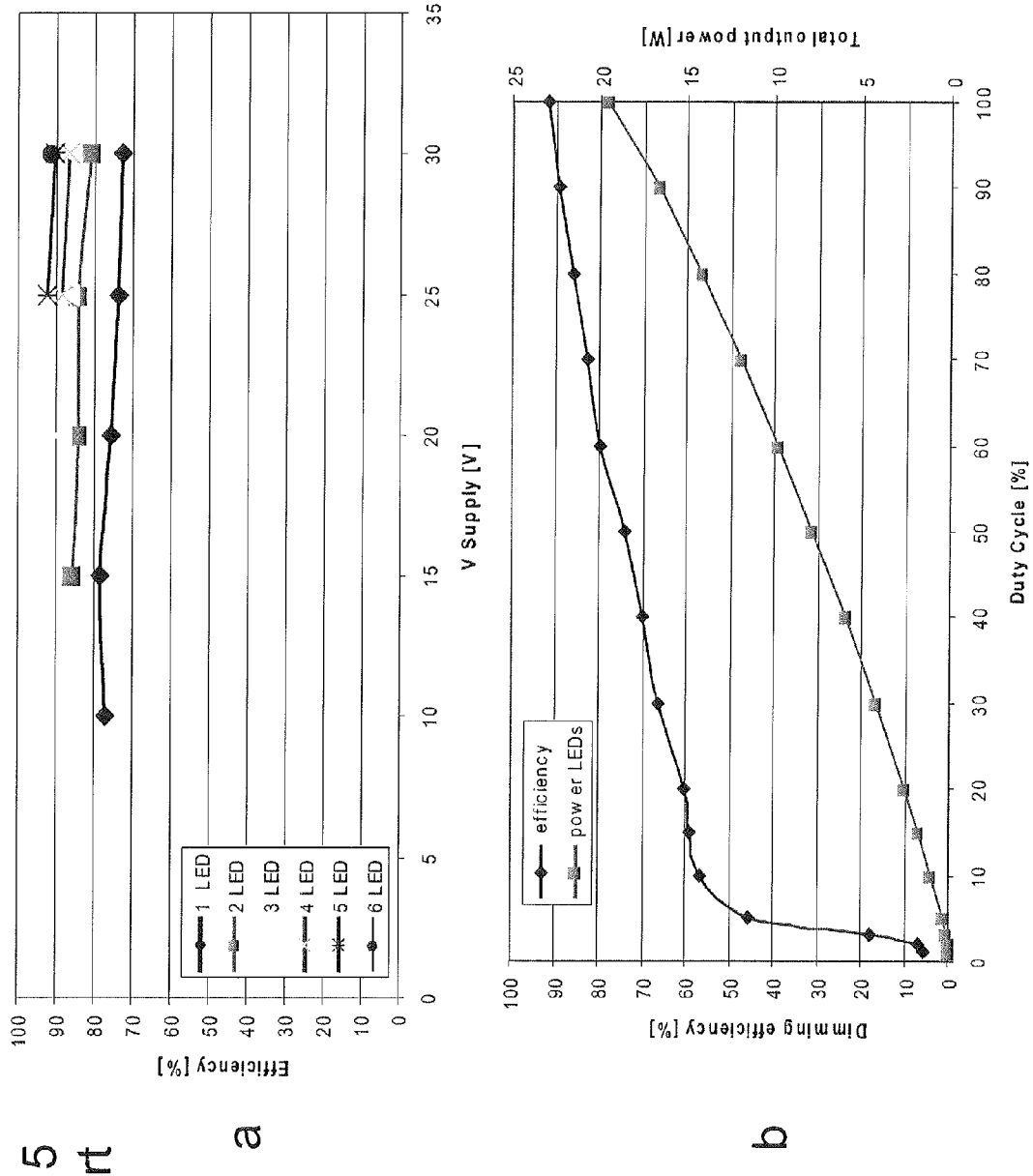
FIG. 5a illustrates how the efficiency of the switch mode regulator changes according to the power loading or number of LEDs against the input voltage of the switching stage.
FIG. 5b illustrates how the efficiency of the switch mode regulator reduces as the total out power is reduced.

FIG. 5a shows the efficiency performance of a ZXLD1360 switch mode regulator from Diode Incorporated, USA used within a typical output drive stage (90) of a prior art PWM based LED driver. As shown, the efficiency of the switch mode regulator decreases as the number of LEDs decreases for a certain system setup. This is to be expected along with a drop in efficiency as the supply voltage increases for a set number of LEDs on the output. The efficiency range for the switch mode regulator varies between 70% and 90% according to the LED load on its output.

FIG. 5b shows the efficiency performance and total LED power output as a function of PWM duty cycle of the prior art ZXLD1360 switch mode regulator. As with most switch mode regulators the efficiency of the output drive stage (90) using PWM as the current control method drops significantly from 40% duty cycle and below. At 40% PWM duty cycle the output drive stage efficiency has already dropped by more than 20% and at a 5% PWM duty cycle the total output drive stage (90) efficiency would be below 20%. The drop off of dimming efficiency of switch mode regulators using a PWM current control method results in poor performance at lower light intensity or output power levels.

Figure 6:
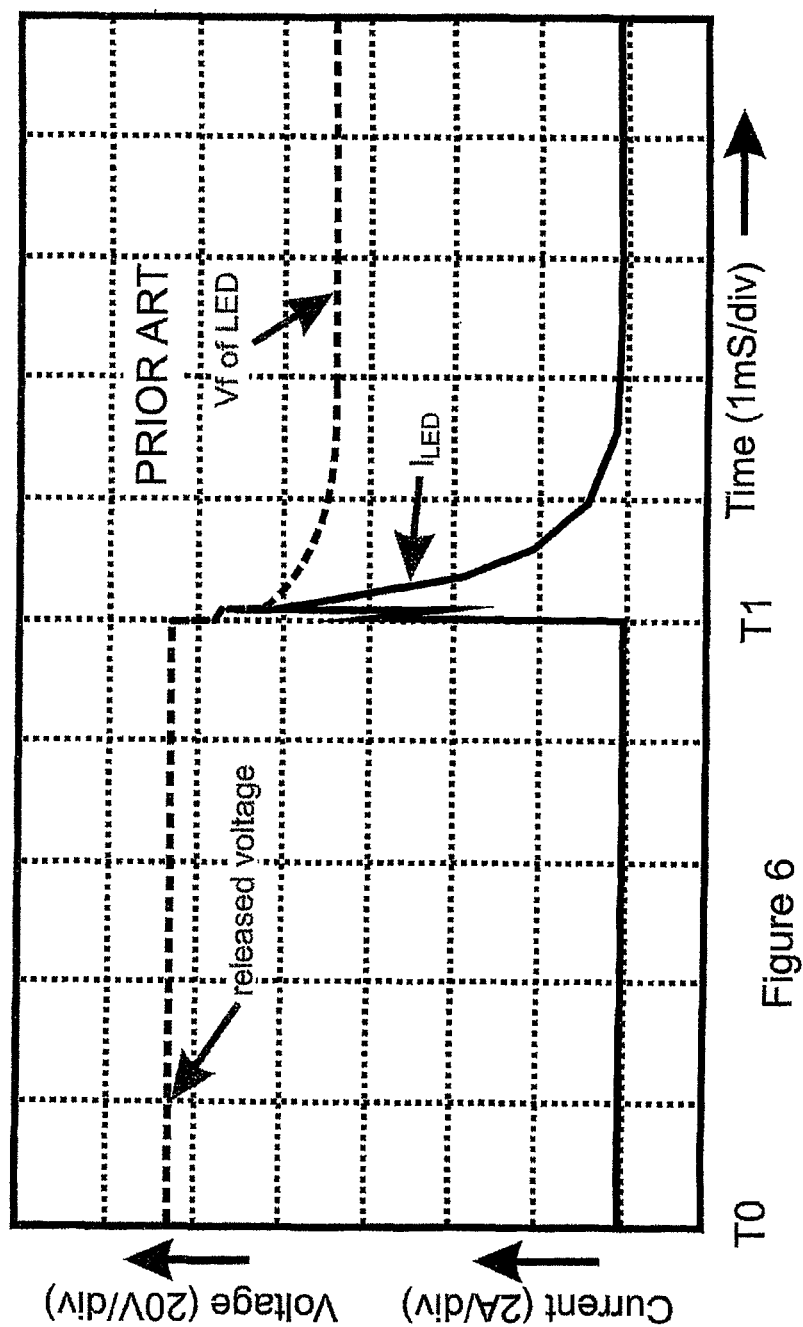
FIG. 6 illustrates how a prior art switch mode regulator can by itself cause damage to an LED through having a high transient start-up current when the LED is connected directly to a switching regulator.

FIG. 6 illustrates the output voltage and current performance of a typical prior art switch mode regulator based output drive stage (90) driving an LED load. The output drive stage (90) is operating between time T0 and T1 in steady state with no LED load attached and has a release voltage of approximately 48V DC with a corresponding output current of 0 mA. However it is shown that as the LED load is connected to the operating output drive stage (90) the output voltage reduces down to the forward voltage of the LED load until a steady state is approached at time T2. The time for steady state to be reached on the output drive stage (90) is approximately 4 mS (T2−T1) however shortly after the LED load is connected to the output drive stage (90) at T1a large forward current spike is seen through the LED ($I_{LED}$). Although this current spike only lasts for a few hundred microseconds its amplitude is large enough to cause a catastrophic failure of the LED load through the failure of the bond wire attached to the LED die. The hybrid control system of the current invention overcomes such excess output drive current spikes as an LED load is connected to an already operating system by utilising the linear stage and current feedback within the output drive stage (90) to measure the forward voltage of the LED load and ensure the switch mode regulator starts up at the correctly required LED load voltage.

Figure 7:
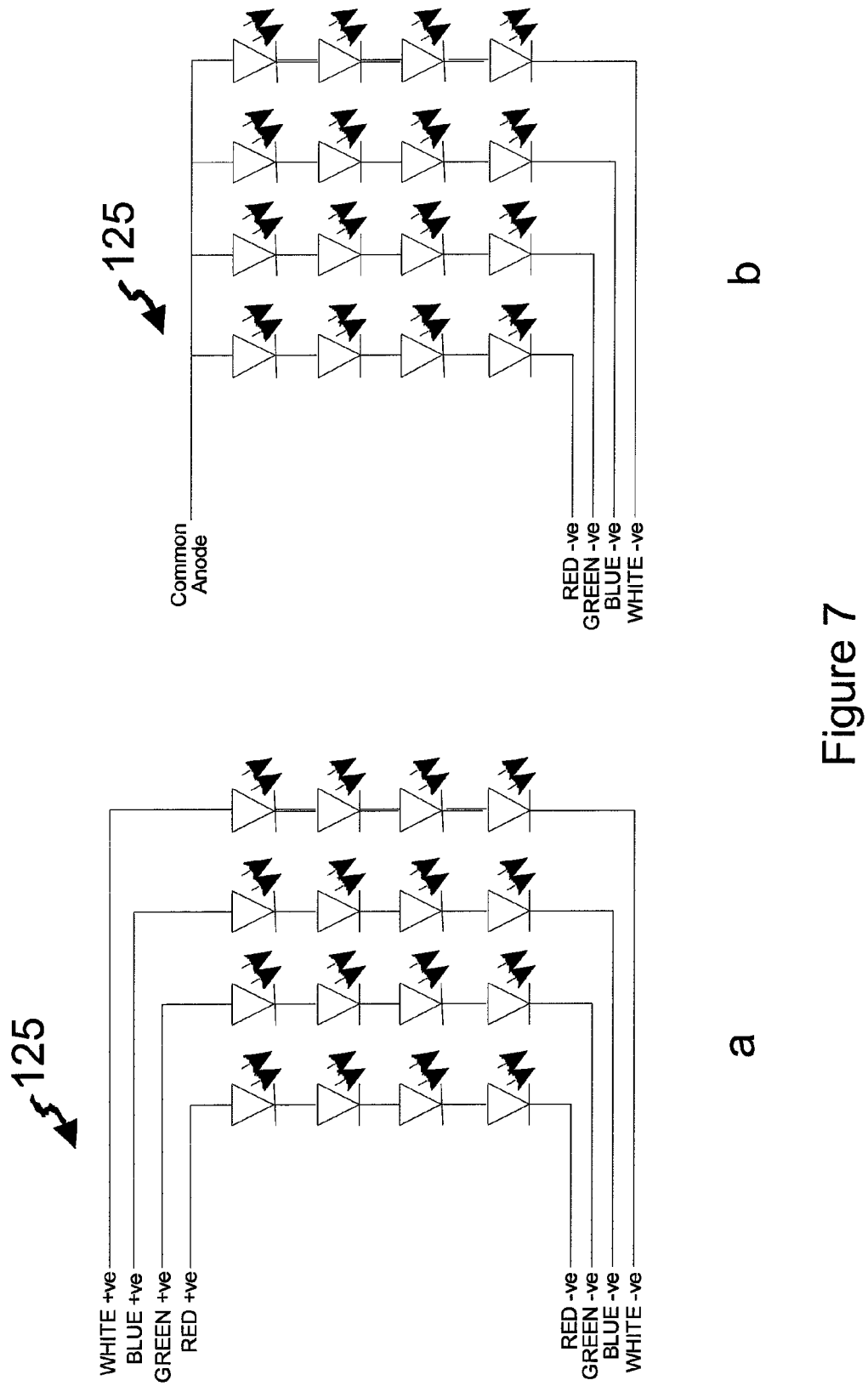
FIG. 7a illustrates how a standard configuration of the light emitting devices can be connected to the hybrid power control system.
FIG. 7b illustrates the common anode arrangement of the light emitting devices can be connected to the hybrid power control system.

FIG. 7a illustrates one embodiment of a typical light emitting device (125) used in an illumination system (1) whereby there are four independent (O)LED channels representing for example, Red, Green, Blue and White colours. In this embodiment each colour channel has the anode and cathode separately wired to four output drive stages (90) and is usually termed the standard method for connecting light emitting devices (125) to output drive stages (90).

FIG. 7b illustrates one embodiment of a typical light emitting device (125) used in an illumination system (1) whereby there are four independent (O)LED channels connected in a common anode arrangement. In such an arrangement the anodes of each of the four channels can be connected together whilst the power to each output channel can still be controlled independently. As discussed the advantage of the common anode arrangement is the number of cores contained within the LED fixture cable (112) is reduced corresponding to a reduction in price.

Figure 8:
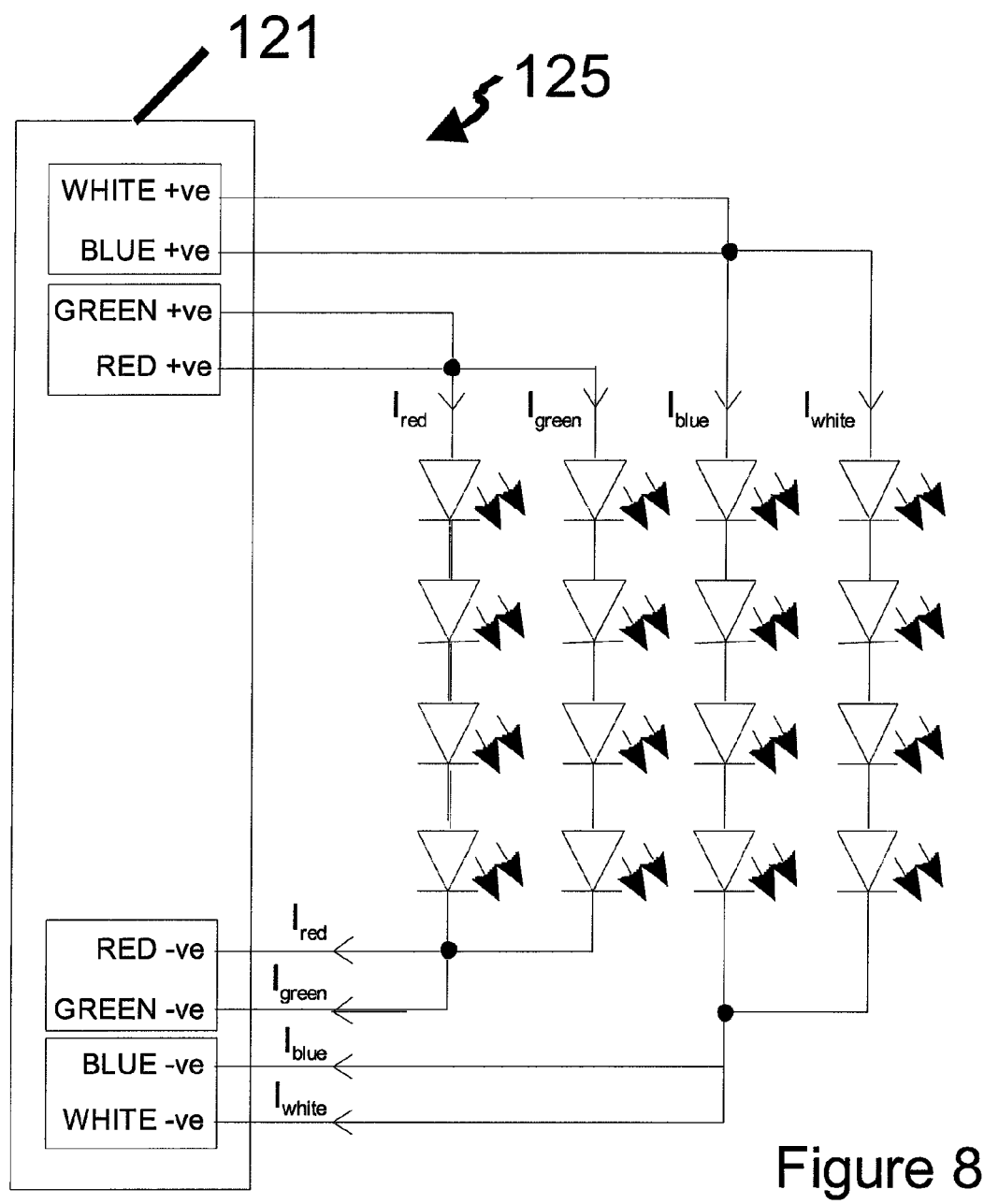
FIG. 8 illustrates how channel bonding of four output stages can be configured into two output stages and the connection arrangement of the light emitting devices.

FIG. 8 illustrates a four channel light emitting device (125) with a connector block (121) where the four output channels are combined into two channels of bonded outputs. In this embodiment the white and blue channel outputs are bonded together at the corresponding anode and cathodes terminals to provide up to 2 times the maximum forward current of a single channel. For example, if the maximum forward current of a single channel is 1000 mA then channel bonding 2 channels together would enable a maximum forward current of 2000 mA to be achieved. The total forward current through the channel bonded output is the sum of the currents $I_{blue}$ and $I_{white}$. Similarly the outputs for the red and green channels may be bonded together. One advantage of channel bonding outputs together enable large forward current light emitting devices (125) to be operated efficiently as smaller more efficient components may be used. A further advantage is that the current resolution is maintained as channels are bonded and the maximum forward current is increased enabling excellent dimming performance no matter the light emitting device (125) configuration.

Figure 9:
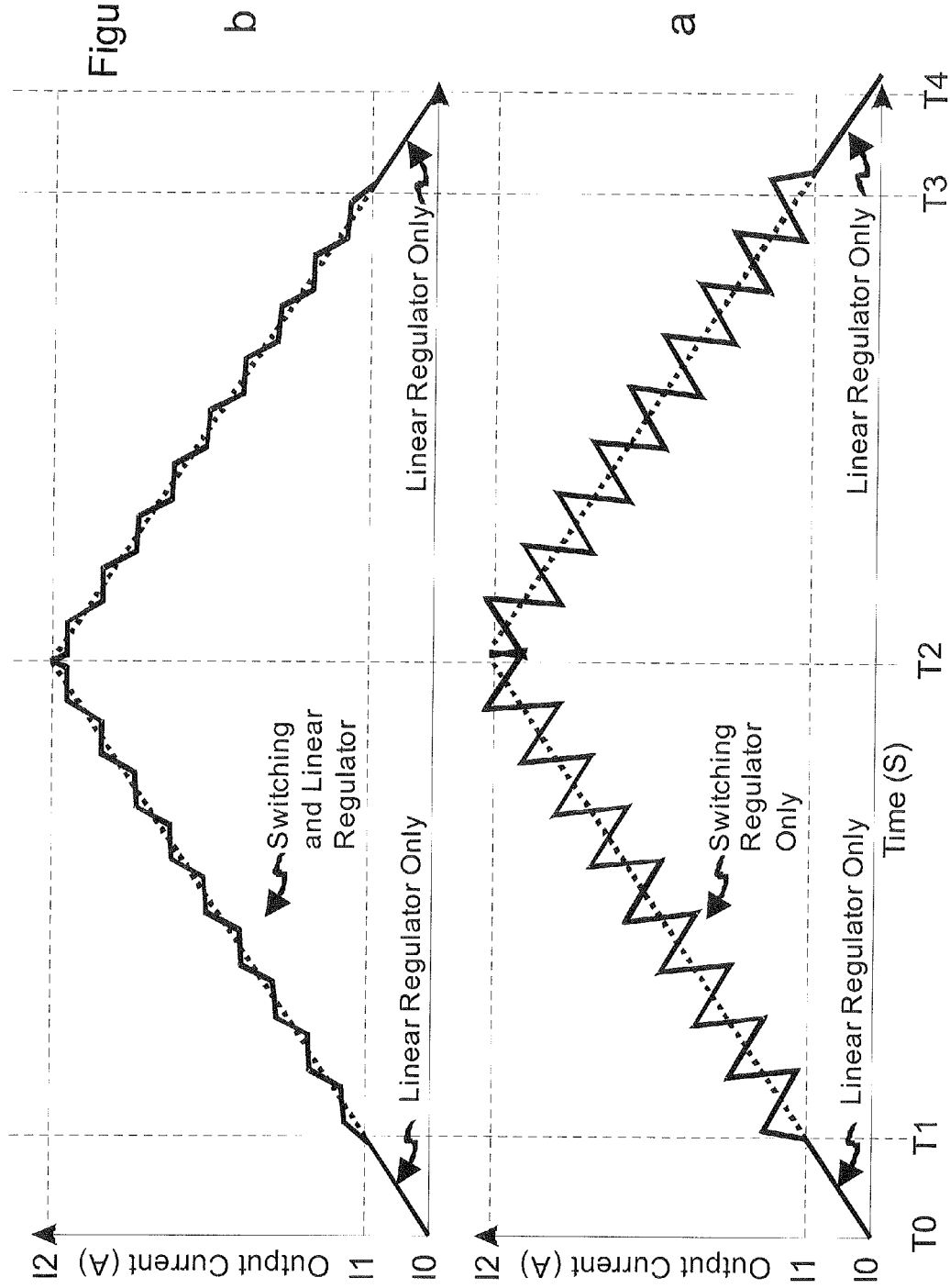
FIG. 9a illustrates an embodiment of the output drive stage combining a linear and switch mode regulator that operate independently.
FIG. 9b illustrates an embodiment of the output drive stage combining a linear and switch mode regulator that operate individually and together.

FIG. 9a illustrates a triangular output current waveform of a light emitting device (125) over time in one embodiment of the present invention. At an output current between I0 and I1 only the linear regulator is used within the output drive stage (90) between time T0 and T1 as well as T3 and T4. The linear regulator provides a very accurate output current with little or no current ripple as shown by a smooth line. Between an output current I1 and I2 of the present embodiment only the switch mode regulator is operating as shown by the jagged line which represents the current ripple associated with the switch mode regulator. The dotted line between times T1 and T4 represents the average current through the switch mode regulator. The transition output current between the linear and switch mode regulator may be set according to the particular illumination system (1) requirements and is controlled by the dynamic control system (80). Typical values of the transition current may range from 1 mA to 100 mA depending on the light emitting device (125) electrical configuration, overall design efficiency and forward current accuracy at low forward currents.

FIG. 9b illustrates a triangular output current waveform of a light emitting device (125) over time in a further embodiment of the present invention whereby the linear stage is operated individually or in combination with a switching regulator. Again between an output current range of 10 and 11 only the linear regulator is used ie; between times T0 and T1 as well as T3 and T4. However, both the linear regulator and switching regulators are used concurrently between time T1 and T3 across an output current range of I1 and I2 as shown by the jagged line. By using both a linear and switching regulator together the current ripple is significantly reduced compared to that shown in FIG. 9a as the dead band range used in the hysteretic control algorithm of the dynamic control system (80) can be reduced as the linear regulator is able to create a small bias current that is super imposed on to the total output drive stage (90) current. By combining the linear and switching regulator operation across the power range I1 to I2 the output drive stage (90) is able to provide reduced current ripple and enhance the current (and power) resolution to the light emitting device (125) with only a small reduction in overall drive efficiency.

Figure 10:
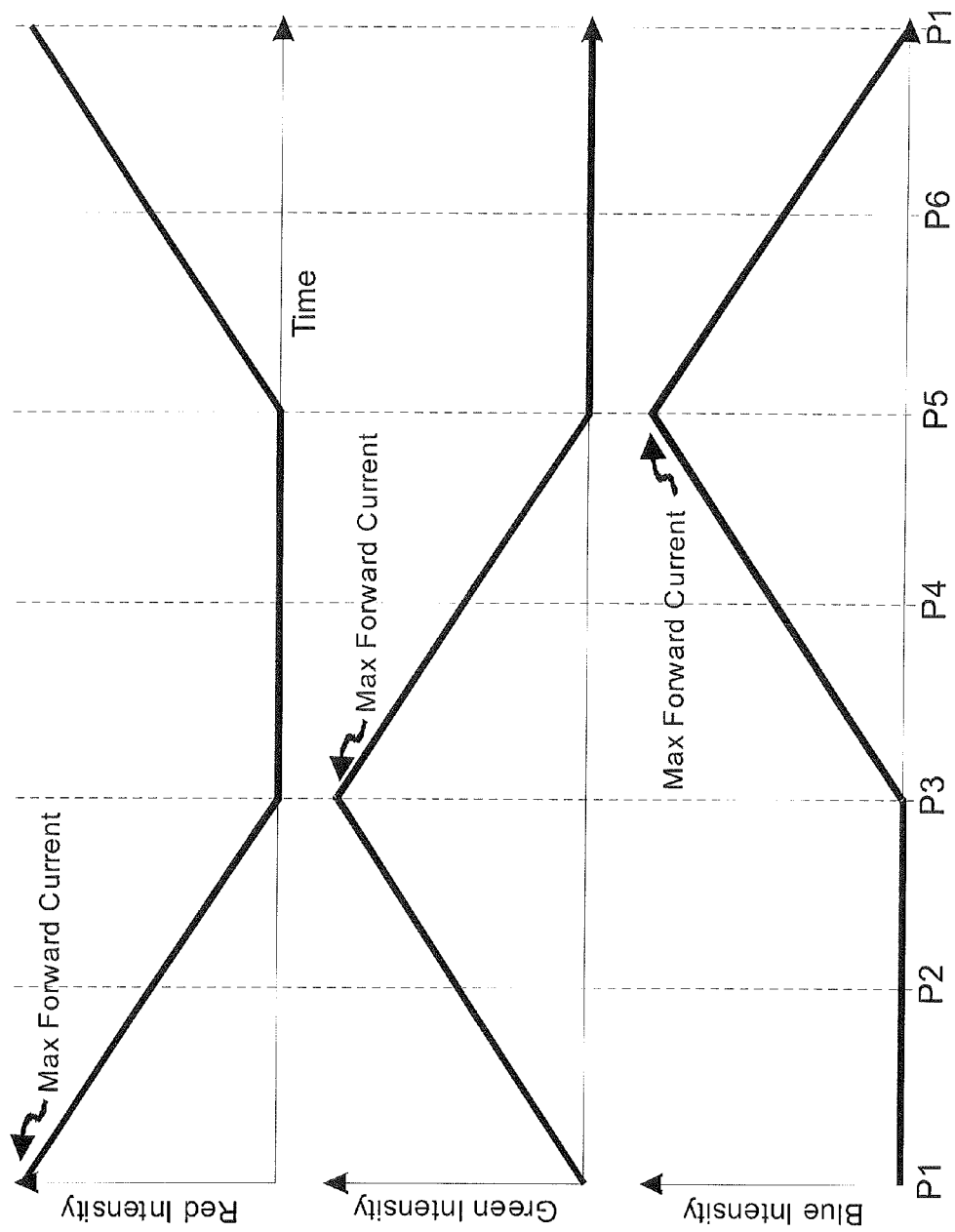
FIG. 10 illustrates how the current or power is used across a three channel (Red, Green and Blue) driver to create a rainbow coloured effect over a defined cycle period.

FIG. 10 shows how three independent output drive stages (90) change the intensity, forward current or power through a light emitting device (125) containing red, green and blue colours to create a rainbow transition effect over a time period of an illumination system (1). In order to create a rainbow transition effect the Red, Green and Blue channels are phased between 0 and maximum intensity (or current or power). Therefore at time P1 only the Red channel is on and therefore the illumination system starts with a Red colour. Then at a time P2 the Red and Green Channels are at 50% of the maximum intensity making the illumination system (1) output colour appear yellow. At a time P3 only the green channel is on and therefore the illumination system (1) shows a green output colour. At a time P4 the Green and Blue Channels are at 50% of the maximum intensity making the illumination system (1) output colour appear Cyan. At a time P5 only the Blue channel is on and therefore the illumination system (1) shows a Blue output colour only. Then at a time P6 the Red and Blue Channels are at 50% of the maximum intensity making the illumination system (1) output colour appear Magenta. The rainbow cycle effect can then be repeated following the sample transitions between times P1 and P6. It is important to note that only one channel is at full intensity at any one time during the rainbow transition effect.

Figure 11:
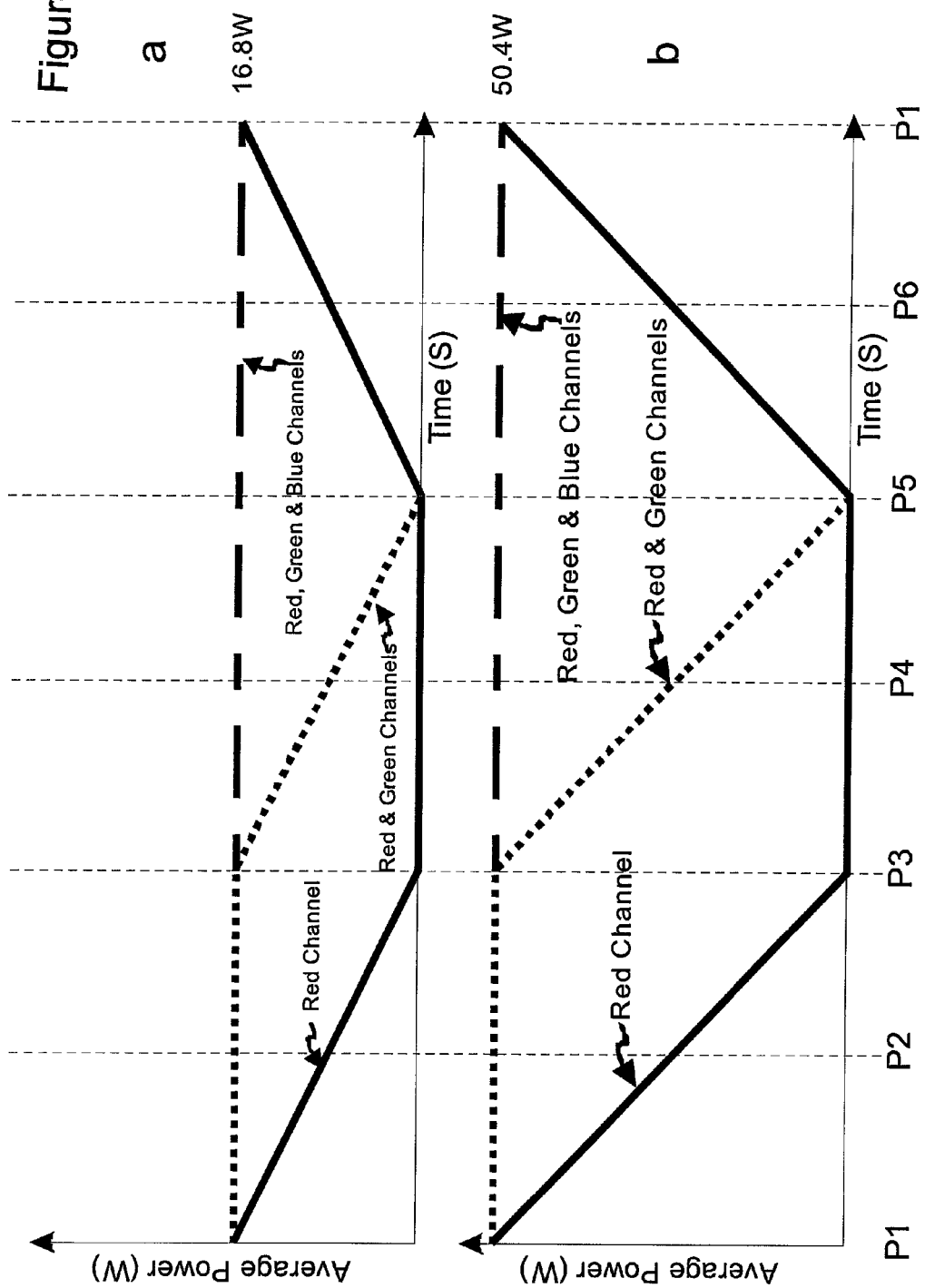
FIG. 11a demonstrates how the dynamic power control system is able to share the average power across three output channels when used in a rainbow coloured effect.
FIG. 11b illustrates how the dynamic power control system is able to share current across three channels to maximise the illumination systems light output when used in a rainbow coloured effect compared to a standard switching based output drive system.

FIG. 11a illustrates the average power consumed of the three output drive stages (90) when the illumination system (1) is being operated in a rainbow transition effect. If each of the output drive stages (90) were operated in a PWM output current mode capable of driving a forward voltage of 48V at a maximum forward current of 350 mA then each stage is capable of delivering 16.8 W of power to each output channel or a total power of 16.8 W*3 channels or 50.4 W. During the rainbow transition effect it is shown that the maximum power used across all three channels at any time during the effect is only 16.8 W and therefore the PWM based illumination system (1) is only operating at ⅓ its full power capacity resulting in a lower operating efficiency of the switch mode power supply.

FIG. 11b illustrates how the present invention is able to utilise dynamic power control in order to maximise the power supplied to the light emitting device (125) and improve the efficiency performance of the switch mode power supply used within the illumination system (1). In one embodiment of the present invention the dynamic control system (80) is able to measure the output power across the three output drive stages and it determines the total power consumed is only ⅓ of the total available power from the switch mode power supply and therefore increases the maximum forward current (or intensity or power) of each channel in order to obtain a combined maximum average power output of 50.4 W. The dynamic control system (80) is able to undertake the dynamic power regulation continuously and therefore is able ensure the maximum power rating of the switch mode power supply is not exceeded. The visual effect of the dynamic power control system (80) is significant as the power output of the illumination system (1) is tripled compared to a standard PWM based output current system for the same input driver rated power. This increase in delivered lumens reduces the total system costs of a lighting installation as the number of lighting fixtures could be reduced or the lighting effect can be significantly enhanced through increased light output. Importantly, the dynamic control system (80) is able to make maximum power adjustments at any time through the transition effect without any visual side effects (changes in combined output channel colour or intensity) being seen by an observer.

Although the dynamic control system (80) is capable of maximising the power usage for a three channel rainbow transition effect further embodiments enable the power output to be maximised according to any transition effect where two or more output drive stages (90) are used.

Figure 12:
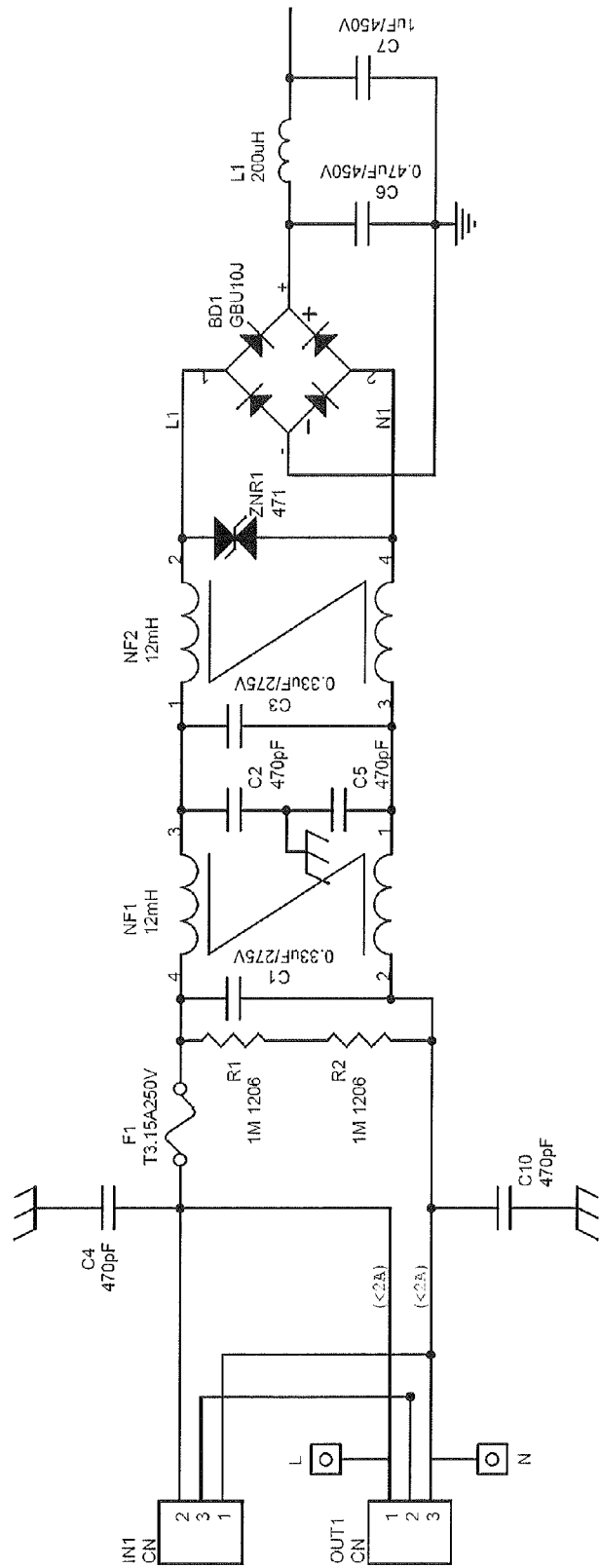
FIG. 12 illustrates an embodiment of a switch mode power supply with power connectors, excess voltage protection, input noise filter and rectifier stages.

FIG. 12 illustrates a circuit schematic of one embodiment of the input power terminal block (21), excess voltage protection module (30), input noise filter module (40) and rectifier module (50) of a switch mode power supply used within an illumination system (1). The power terminal block (21) comprises of two connectors (IN1 CN and OUT1 CN) to enable the switch mode power supply to be daisy-chained together easily for installations where more than one illumination system (1) is to be used. A fuse (F1) and a transient voltage suppressor (ZNR1) is used to protect the system against excess voltages from the output of the power source module (10). An input noise filter module (40) is constructed from capacitors (C1, C2, C3, C4, C5 and C10), inductors (NF1 and NF2) and resistors (R1 and R2) to ensure noise is not entering the illumination system (1) from the power source or vice-versa. The rectifier module (50) comprises of a bridge rectifier (BD1) to rectify the AC power source which is smoothed by capacitors (C6 and C7).

Figure 13:
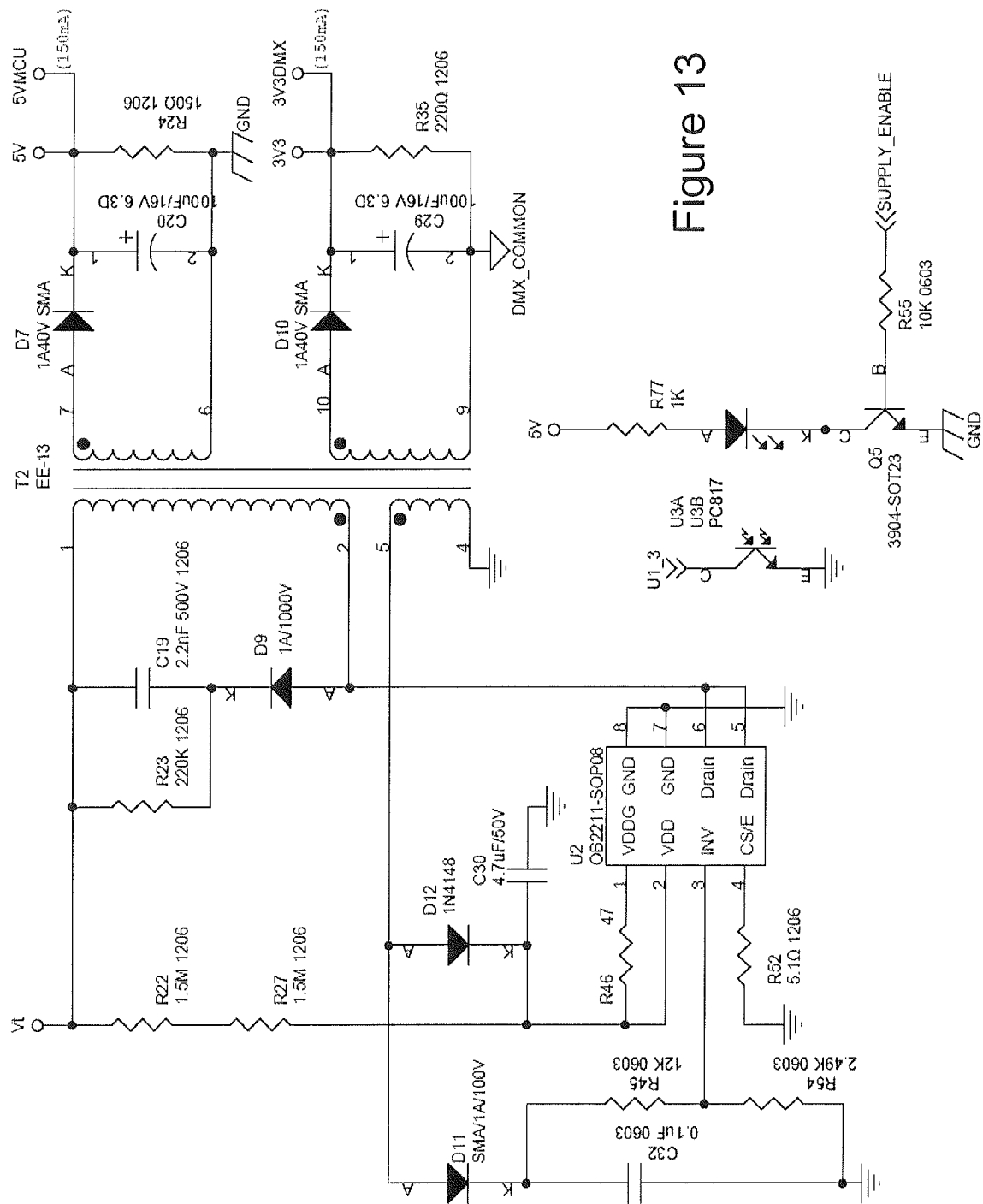
FIG. 13 illustrates an embodiment of a switch mode power supply with a standby features for low power consumption in inactive periods.

FIG. 13 illustrates one embodiment of a switch mode power supply standby feature for low power consumption in inactive periods of the illumination system (1). The standby power supply is required to provide power to the dynamic power control system (80) and the communication bus (24) so that the main switch mode power supply can be reactivated if a master controller (2) or user wishes to restart the illumination system (1). In this particular embodiment, the power to the dynamic control system (80) is provided by 5VMCU and the power to a DMX or Remote Device Management (RDM) communications bus (24) is provided by 3V3DMX through a galvanic isolated transformer T2. The power of the standby circuit function is regulated by the semiconductor IC (U2). A signal (SUPPLY_ENABLE) from the dynamic control system (80) is able to shut down the main switch mode power supply using an opto-isolator (U3) to reduce energy consumption when the light emitting device (125) in the illumination system (1) is not being used.

Figure 14:
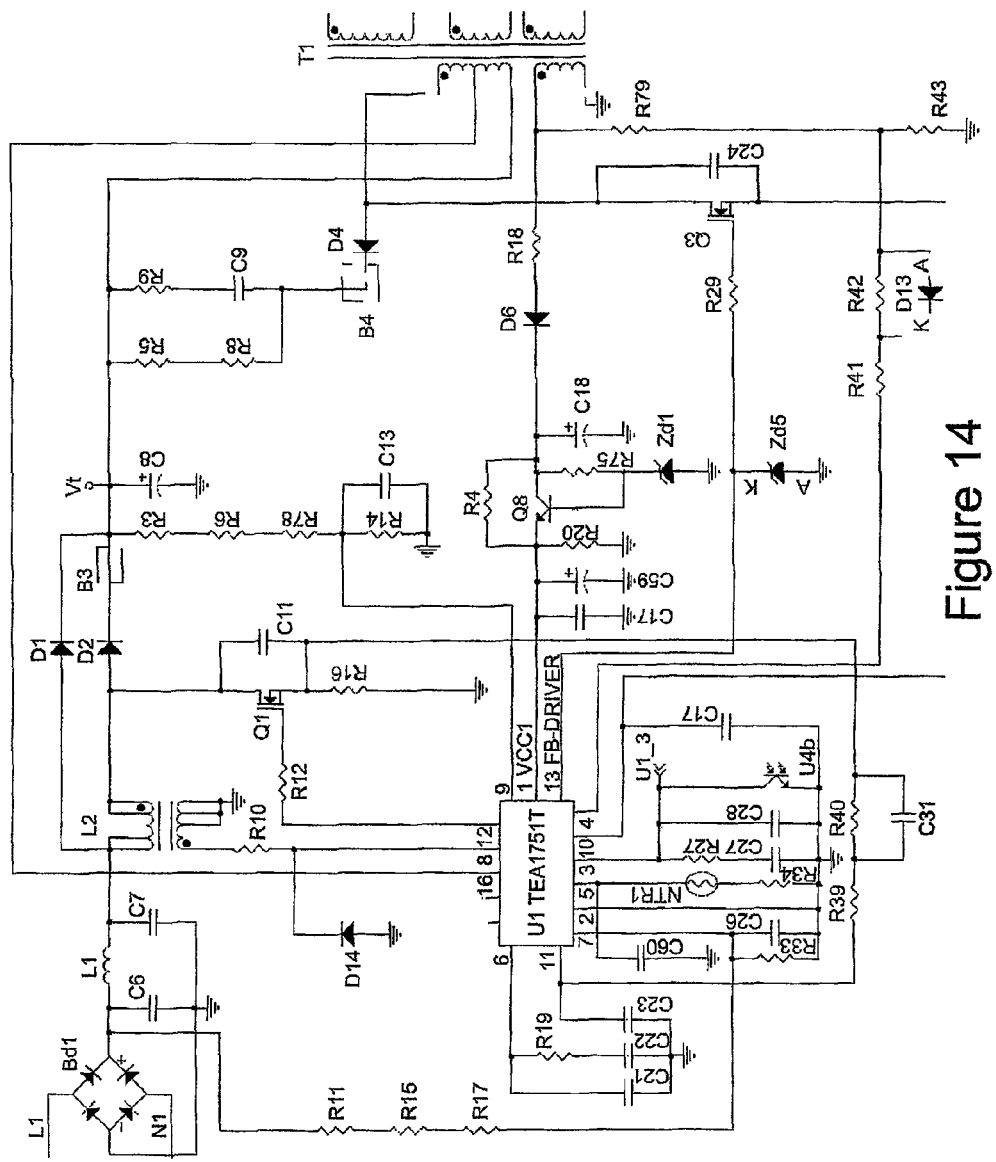
FIG. 14 illustrates an embodiment of a switch mode power supply circuit with Power Factor Correction followed by a Flyback convertor with thermal, under voltage, over voltage, over current and over power shutdown protection features.

FIG. 14 illustrates an embodiment of a switch mode power supply circuit with Power Factor Correction followed by a flyback convertor with thermal, under voltage, over voltage, over current and over power shutdown protection features. The core of the switch mode power supply is the semiconductor controller (U1) such as the TEA1751T from NXP BV, Holland which provides high efficiency at all output power levels. This applies to quasi-resonant operation at high power levels, quasi-resonant operation with valley skipping, as well as to reduced frequency operation at lower power levels. At low power levels, the PFC switches off to maintain high efficiency. During low power conditions, the flyback controller switches to frequency reduction mode and limits the peak current to 25% of its maximum value. This will ensure high efficiency at low power and good standby power performance while minimizing audible noise from the transformer (T1).

In order to provide a start-up and Under Voltage Lock Out (UVLO) features the capacitor on the VCC pin is charged from the high voltage mains via the HV pin. As long as VCC is below Vtrip, the charge current is low. This protects the IC if the VCC pin is shorted to ground. For a short start-up time the charge current above Vtrip is increased until VCC reaches a UVLO threshold voltage Vth(UVLO). If VCC is between Vth(UVLO) and Vstartup, the charge current is low again, ensuring a low duty cycle during fault conditions.

The control logic activates the internal circuitry of the controller (U1) and switches off the HV charge current when the voltage on pin 1 VCC passes the Vstartup level. First, the LATCH pin 5 current source is activated and the soft start capacitors on the PFCSENSE pin 11 and FBSENSE pin 10 are charged. When the LATCH pin 5 voltage exceeds the Ven(LATCH) voltage and the soft start capacitor on the PFCSENSE pin 11 is charged, the PFC circuit is activated. Also the flyback converter is activated (providing the soft start capacitor on the FBSENSE pin 10 is charged). The output voltage of the flyback converter is then regulated to its nominal output voltage. The IC (U1) supply is taken over by the auxiliary winding of the flyback converter.

As soon as the flyback converter is started, the voltage on the FBCTRL pin 3 is monitored. If the output voltage of the flyback converter does not reach its intended regulation level in a predefined time, the voltage on the FBCTRL pin 3 reaches the Vto(FBCTRL) level and an error is assumed. The TEA1751 (U1) then initiates a safe restart.

When one of the protection functions is activated, both converters stop switching and the VCC voltage drops to Vth (UVLO). A latched protection recharges the capacitors (C17, C59) via the HV pin 16, but does not restart the converters. For a safe restart protection, the capacitor is recharged via the HV pin and the device restarts.

In the event of an overvoltage protection of the PFC circuit, $V_{VOSENSE} > Vovp(V_{OSENSE})$, only the PFC controller stops switching until the VOSENSE pin 9 voltage drops below $V_{OVP}(V_{OSENSE})$ again. Also, if a mains undervoltage is detected $V_{VINSENSE} < V_{stop(VINSENSE)}$, only the PFC controller stops switching until $V_{VINSENSE} > V_{start(VINSENSE)}$ again.

When the voltage on pin VCC drops below the undervoltage lockout level, both controllers stop switching and reenter the safe restart mode.

Pin 5 LATCH is a general purpose input pin, which can be used to switch off both converters. In one embodiment the resistor (R34) and thermistor (NTR1) connects to Pin 5 LATCH and switches off the controller if an over temperature state occurs.

The PFC MOSFET (Q1) is switched on after the transformer is demagnetized. Internal circuitry connected to the PFCAUX pin 8 detects the end of the secondary stroke. It also detects the voltage across the PFC MOSFET (Q1). The next stroke is started when the voltage across the PFC MOSFET (Q1) is at its minimum in order to reduce switching losses and ElectroMagnetic Interference (EMI) (valley switching).

To protect the internal circuitry during high voltage lightning events a 5K1 Ohms series resistor (R10) is connected to the PFCAUX pin 8. To prevent incorrect switching due to external disturbance, the resistor (R10) should be placed close to the IC (U1) on the printed-circuit board.

The mathematical equation for the transfer function of a power factor corrector contains the square of the mains input voltage. In a typical application this results in a low bandwidth for low mains input voltages, while at high mains input voltages the Mains Harmonic Reduction (MHR) requirements may be hard to meet. To compensate for the mains input voltage influence, the TEA1751 (U1) contains a correction circuit. Via the VINSENSE pin 7 the average input voltage is measured and the information is fed to an internal compensation circuit. With this compensation it is possible to keep the regulation loop bandwidth constant over the full mains input range, yielding a fast transient response on load steps requirements. In the current embodiment, the bandwidth of the regulation loop is set by the resistor (R19) and two capacitors (C21 and C22) on the PFCCOMP pin 6.

In order to maintain an overcurrent protection function the maximum peak current is limited cycle-by-cycle by sensing the voltage across an external sense resistor (R39) on the source of the external MOSFET (Q1). The voltage is measured via the PFCSENSE pin 11.

For mains UVLO or brownout protection the controller (U1) prevents the PFC from operating at very low mains input voltages, the voltage on the VINSENSE pin 7 is sensed continuously. As soon as the voltage on this pin drops below the V stop(VINSENSE) level, switching of the PFC is stopped.

To prevent output overvoltage during load steps and mains transients, an overvoltage protection circuit is built in. As soon as the voltage on the VOSENSE pin 9 exceeds the $V_{ovp(VOSENSE)}$ level, switching of the power factor correction circuit is inhibited. Switching of the PFC recommences as soon as the VOSENSE pin voltage drops below the $V_{ovp(VOSENSE)}$ level again. When the resistor (R14) between pin 9 VOSENSE and ground is open, the overvoltage protection is also triggered.

The driver circuit to the gate of the power MOSFET (Q1) has a current sourcing capability of typically −500 mA and a current sink capability of typically 1.2 A. This permits fast turn-on and turn-off of the power MOSFET (Q1) for efficient operation.

Current mode control is used for the flyback converter for its good line regulation. The primary current is sensed by the FBSENSE pin 10 across an external resistor (R51) and compared with an internal control voltage. The internal control voltage is proportional to the FBCTRL pin 3 voltage.

The Switch Mode Power Supply controller (U1) can be shut down and restated by toggling the input FBCTRL pin 3 using the microprocessor (81) from the dynamic control system (80). Shutting down the controller (U1) significantly reduces the power consumed by the illumination control system (1).

Figure 15:
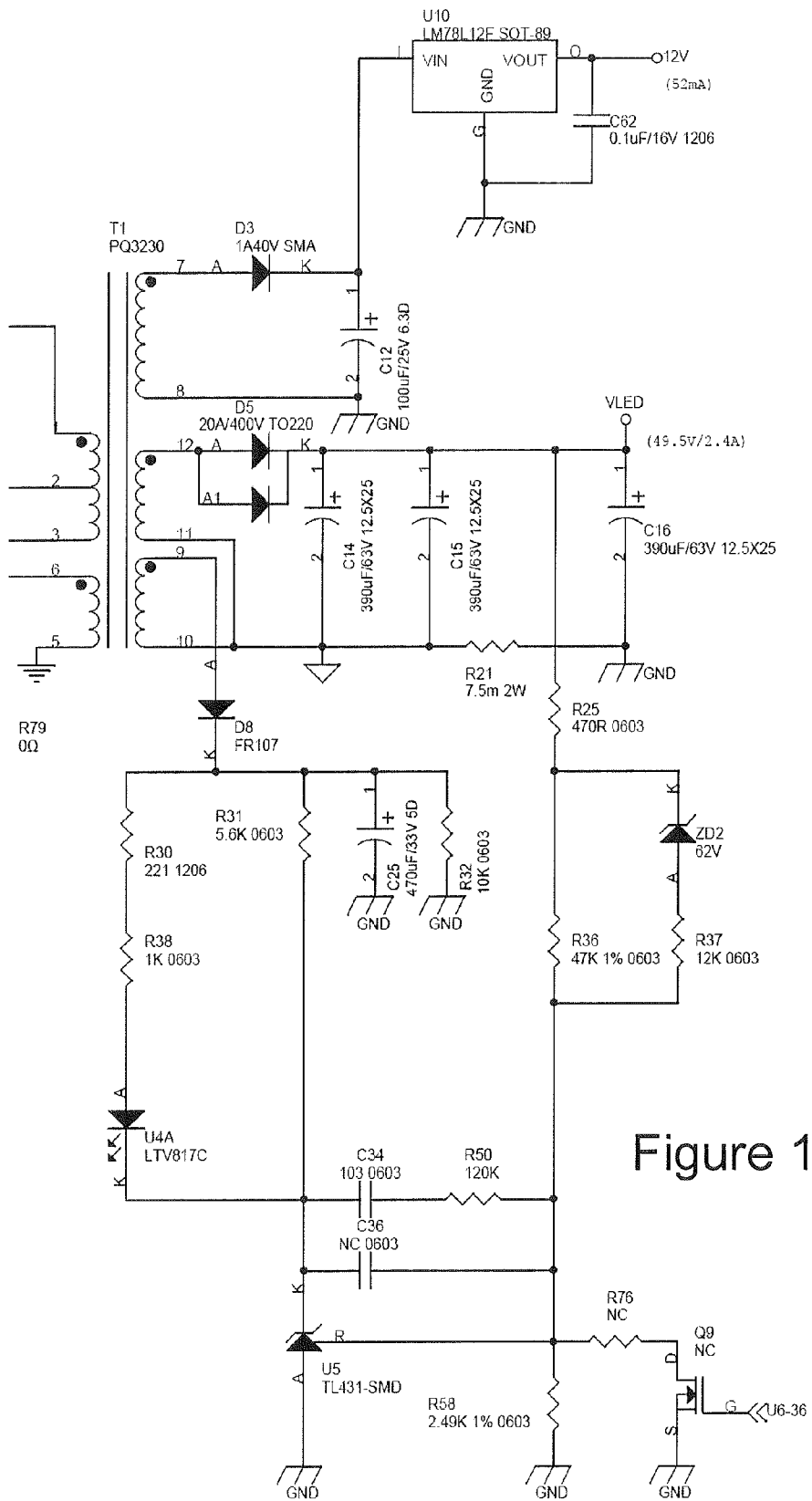
FIG. 15 illustrates an embodiment of a switch mode power supply with Isolation and power stage features.

FIG. 15 illustrates an embodiment of a switch mode power supply with Isolation and power stage features. The galvanic isolation is provided by a transformer (T1) that has multiple windings to provide power stages with different output voltages. Winding terminals 7 and 8 provide a voltage to a capacitor (C12) used to smooth the voltage ripple. A linear regulator (U10) is used to provide a regulated 12V output. Winding terminals 11 and 12 are used to provide a 49.5V output for the main light emitting device (125) power supply. Output capacitors (C14, C15 and C16) are all used to smooth ripple current. Further transformer windings 9 & 10 are used to sense the current in the transformer and provide feedback to the rest of the flyback transformer circuit.

Figure 16:
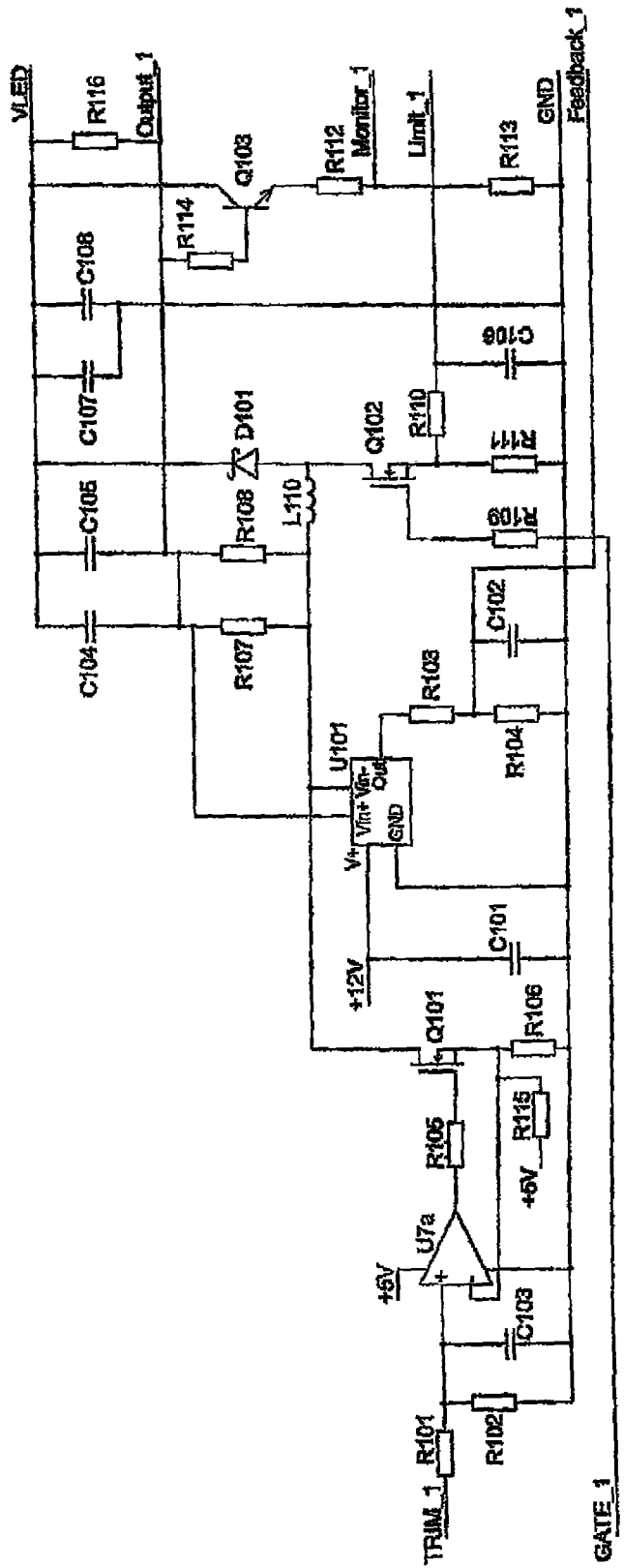
FIG. 16 illustrates an embodiment of a switch mode power supply with an output drive stage that combines a linear and switch mode regulator, output noise filter, interface for voltage, current and short circuit sensors as well as an output light emitting device connector.

FIG. 16 illustrates an embodiment of a switch mode power supply with an output drive stage (90) that combines a linear and switch mode regulator, output noise filter (100), interface for voltage, current and short circuit sensors as well as an output light emitting device connector (121).

The linear regulator is created using an input (TRIM_1) from the microprocessor (87) in the dynamic power control system (80) followed by a low pass filter using resistor (R102) and capacitor (C103). The output voltage created by the low pass filter is provided to the positive terminal of a differential amplifier (U7a) that is used to sense the current through the linear regulator by comparing the voltage across resistor (R106) at the negative terminal of the differential amplifier (U7a). The output of the differential amplifier (U7a) is used to drive a switching MOSFET (Q101) to provide an accurate current sink.

An accurate current shunt monitor (U101) is used to measure the current through the light emitting device (125) via current sense resistors (R107 and R108). In this embodiment, two sense resistor are used to enable high output drive currents as power dissipation can be shared across the two resistors. The output of the current shunt monitor (U101) is provided to a microprocessor (87) for inclusion into the control algorithms. The switching regulator is created using the switching MOSFET (Q102), inductor (L101) and flyback diode (D101) components. In order to make the output drive stage robust and capable of operating in a common anode and channel bonding mode the current shunt monitor (U101) is placed on the high side of the switching MOSFET (Q102). In this embodiment of the present invention short circuit protection is provided by resistor (R111) that is feedback to the microprocessor (87) which will shut down the switching MOSFET (Q102) when a short circuit is detected on the output. In order to measure the voltage of the light emitting device (125) connected to the output terminals (VLED and OUTPUT_1) an emitter follower arrangement is used with a transistor (Q103) and resistors (R114, R112 and R113) to provide a voltage to the microprocessor (87) on output (MONITOR_1).

Figure 17:
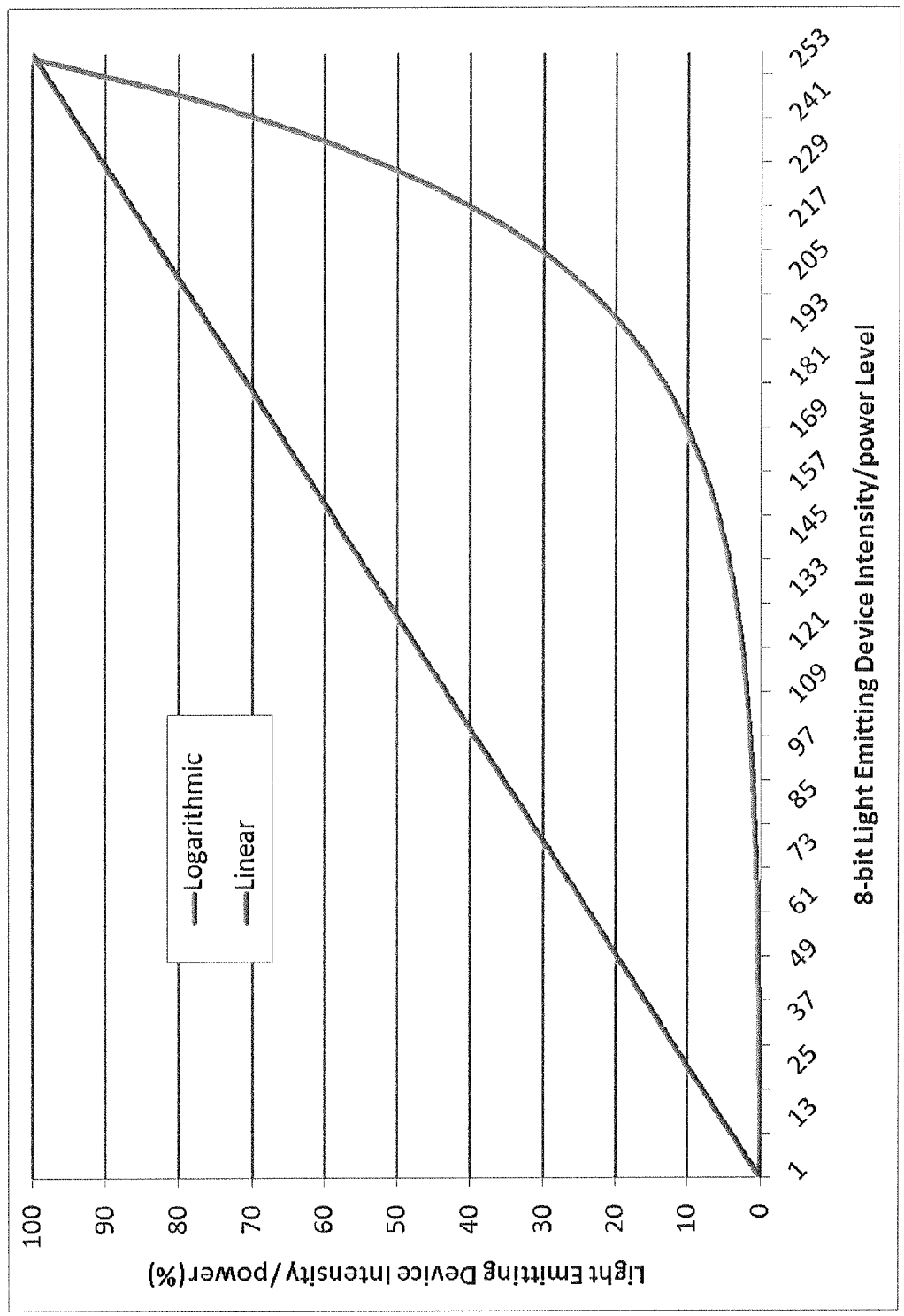
FIG. 17 illustrates the non-linear/logarithmic and linear light emitting device intensity/current/power curve used in DALI white light applications.

FIG. 17 illustrates the non-linear/logarithmic and linear light emitting device intensity/current/power curve used in DALI white light applications. In further embodiments of the present invention the hybrid power control system is able to create any linear or non-linear dimming curves or a combination of both thereof.

Although the preferred embodiments of the invention are discussed herein in relation to solid-state lighting devices such as LEDs and OLEDs, it should be understood that the present invention can be applied to other lighting technologies that rely on power regulation to operate and be dimmed.

The present disclosure extends to any novel feature or combination of features disclosed herein whether express or implied and to any generalisation thereof.

The invention claimed is:

1. A hybrid power control system for providing dynamic power control to illumination systems comprising:
    a power source to supply any one of a range of AC or DC voltages;
    a light emitting device;
    one or more switch mode power supplies incorporating one or more linear and switch mode regulator circuits combined to dynamically control current, voltage and power to the illumination system;
    a microprocessor or other integrated circuit device to receive and send control information in order to regulate the power to the light emitting device;
    one or more output drive stage(s) capable of delivering a wide dynamic current range, channel bonding and protection circuitry compatible with standard or common anode illumination systems.

2. A hybrid power control system according to claim 1 wherein said illumination system incorporates light emitting device(s) comprising single or multiple light emitting packages containing one or more light emitting elements capable of radiating a single colour, which includes white, or a plurality of colours.

3. A hybrid power control system according to claim 1 wherein said linear regulator(s) describes one or more of the following topologies:
Voltage regulator
Resistor current source
Active current source
JFET, PFET or NFET current source
Transistor current source
Widlar or Wilson current source
Zener or series regulator
any other type of voltage or current source topology
and wherein the said topologies provide safety, component value and temperature variation compensation methods including one or more of the following features: current limiting, foldback, thermal shutdown, safe area protection, over current, short circuit or output power protection.

4. A hybrid power control system according to claim 1 wherein said switch mode power supplies incorporating a switching regulator are either isolated or non-isolated and describes one or more of the following input and output waveform topologies:
AC signal in, DC signal out
DC signal in, DC signal out
AC signal in, AC signal out
DC signal in, AC signal out
and wherein said switch mode regulator topology can provide one or more DC output voltages or currents through one or more of the following methods:
Flyback convertor
Ringing Choke convertor
Half-Forward convertor
Forward convertor
Resonant forward convertor
Push-pull convertor
Half-Bridge convertor
Full-Bridge convertor
Resonant, zero voltage switched convertor
Isolated Cuk convertor
any other type of switch mode topology.

5. A hybrid power control system according to claim 4 wherein said AC to DC topology may include one or more of the following features:
Input and output power terminal blocks
Excess input voltage protection means
Input noise filter means
Rectifier and current limiter
Power Factor Correction
Power bank
Output current limiter, power limiter, voltage regulator, thermal shutdown, short circuit protection
Output noise and ripple filter
Standby, low power or shutdown means.

6. A hybrid power control system according to claim 4 wherein the said topologies provide safety, component value and temperature variation compensation methods including current limiting, foldback, thermal shutdown, safe area protection, over current, short circuit or output power protection.

7. A hybrid power control system according to claim 4 wherein said DC to DC topology can provide one or more DC output voltages or currents using either continuous conduction or discontinuous conduction mode through one or more of the following methods:
Buck
Boost
Buck-boost
Split-pi
Cuk
SEPIC
Zeta
Charge pump
any other type of DC to DC switching topology.

8. A hybrid power control system according to claim 4 wherein said DC to DC topology comprises:
an inductor, connected in series with a light emitting device;
a switch connected in series with the inductor and light emitting device;
a control circuit to directly or indirectly generate a control signal to modulate the ON/OFF of the switch in response to a desired light emitting device voltage or current;
a flyback diode, coupled in parallel to the light emitting device and inductor for discharging the energy of the inductor through the light emitting device and wherein the control circuit further comprises:
an integrated circuit, microprocessor or any other similar semiconductor means to generate the switch control signal;
a means for measuring the current flowing through the light emitting device;
a means for measuring the voltage present across the light emitting device;
a means for receiving light emitting device characteristics such as light intensity, light colour, light emitting device temperature;
a means for receiving sensor information characterising the environment in proximity to the light emitting device including temperature, ambient light intensity, ambient light colour, occupancy information amongst others;
a means for transceiving information across a control network, sensor network or user interface;
a means for providing component and circuit protection to a variety of possible non standard operating conditions.

9. A hybrid power control system according to claim 1 wherein said dynamic power control system comprises:
at least one AC to DC switch model power supply incorporating a power standby feature for low power consumption during inactive periods of use and a means for measuring input power consumption;
one or more output driver stages containing one linear current regulator combined with one DC to DC switch mode regulator;
a means for measuring output power consumption of the one or more output stages;
a means for providing internal and external control commands to the microprocessor or other integrated circuit device from or to a sensor network, data control network or user interface;
a means for distributing power across one or more output driver stages
and wherein said output driver stage(s) is preferably capable of a soft start feature that utilises a linear regulator at low light emitting device currents to protect against large start-up currents associated with switch mode regulators
and wherein said linear regulator(s) and switch mode regulator(s) are combined to operate individually or concurrently over a wide light emitting device current range to increase the accuracy and efficiency of the system.

10. A hybrid power control system according to claim 1 wherein said dynamic power control system is able to dynamically configure the duty cycle and fundamental switching frequency of the one or more switch mode regulators and wherein said dynamic power control system is preferably able to configure the switching frequency of the one or more switch mode regulators dynamically to provide a single fundamental frequency or continuously varying fundamental switching frequency according to the desired output characteristics of the load or light emitting device and wherein said dynamic power control system is preferably able to synchronise the switching frequency of the one or more switch mode regulators dynamically.

11. A hybrid power control system according to claim 1 wherein said dynamic power control system is able to provide linear or non-linear current or power profiles over a quantised time interval to the light emitting device.

12. A hybrid power control system according to claim 1 wherein said dynamic power control system comprises a means to detect the peak or average current passing through the light emitting device to regulate the current (or power) to said light emitting device.

13. A hybrid power control system according to claim 1 wherein said dynamic power control system comprises a means to provide common anode and channel bonding capabilities between one or more light emitting device output channels such that the current detection method is floating on either a P-type or N-type switching device incorporated into the switch mode regulator topology.

14. A hybrid power control system according to claim 1 wherein said dynamic power control is achieved by measuring the power consumed at the interface between the output of the AC/DC switching stage and the input of the one or more DC/DC light emitting device stages or by measuring the power consumed at the output of the one or more output driver stages.

15. A hybrid power control system according to claim 1 wherein the light output characteristic of the illumination system can be controlled by one or more of the following:

the intensity of the illumination system;

the power spectral density of the illumination system;

the correlated colour temperature of the illumination system;

the colour rendering index of the illumination system;

the beam angle of the illumination system.

16. A hybrid power control system according to claim 1, wherein the output drive stage(s) are capable of delivering a current to one or more light emitting device(s) with a magnitude down to 1 microAmpere in a controlled manner.

17. A hybrid power control system according to claim 1, wherein the output drive stage(s) are capable of operating over a wide dynamic current range with a maximum range limit selected by the microprocessor or other integrated circuit device from $2^8$ to $2^{32}$ bits.

18. A hybrid power control system according to claim 1, wherein the output stage can deliver power to one or more light emitting devices using pulsed, non-pulsed or analogue current profiles either exclusively or combined wherein the current profile through the light emitting device may be Direct Current, Alternating Current, Pulse Width Modulation, Pulse Amplitude Modulation, Pulse Frequency Modulation, Pulse Density Modulation, Delta Sigma Modulation, Stochastic Signal Density Modulation (SSDM), Amplitude Modulation or any other current control technique.

19. A hybrid power control system according to claim 1, further comprising a closed loop feedback system arranged to cause the precise control of the colour, intensity, frequency, CCT, CRI and power spectral density of the illumination system and/or a switch mode regulator having a fixed switching frequency over a wide range of frequencies or a continuously variable switching frequency or any combination of frequency control.

20. A hybrid power control system according to claim 1, wherein feedback means is arranged to measure through a sensor network capable of measuring temperature, current, voltage, power, intensity and colour of the light emitting device along with other environmental parameters that are measured externally to the illumination system.

* * * * *